US005569353A

United States Patent [19]

Zodrow

[11] Patent Number: 5,569,353

[45] Date of Patent: Oct. 29, 1996

[54] LABELLING MACHINE AND APPARATUS FOR THE AUTOMATIC LOADING OF THE MAIN MAGAZINE OF A LABELLING MACHINE, AND A SUPPLY MAGAZINE WHICH CAN BE USED IN SUCH AN APPARATUS

[75] Inventor: Rudolf Zodrow, Düsseldorf, Germany

[73] Assignee: KHS ETI-TEC Maschinenbau GmbH, Erkrath, Germany

[21] Appl. No.: 444,621

[22] Filed: May 19, 1995

[30] Foreign Application Priority Data

May 19, 1994 [DE] Germany .......................... 44 17 497.7

[51] Int. Cl.$^{6}$ .............................. B32B 31/00; B65C 9/00

[52] U.S. Cl. .......................... 156/566; 156/564; 156/568; 156/571; 156/DIG. 29; 221/104; 271/9.01; 271/157

[58] Field of Search .................................... 156/564, 566, 156/567, 568, 565, 570, 571, 573, DIG. 29; 271/9.01, 157, 158, 159; 221/104, 105, 106

[56] References Cited

U.S. PATENT DOCUMENTS

| | | | |
|---|---|---|---|
| 1,536,835 | 5/1925 | Fredsell | 156/DIG. 29 |
| 2,060,193 | 11/1936 | Gilson | 156/565 X |
| 3,180,521 | 4/1965 | Domenico et al. | 221/105 |
| 3,915,338 | 10/1975 | Kronseder et al. | 156/DIG. 29 |
| 4,369,089 | 1/1983 | Mohn et al. | 271/158 X |
| 4,457,801 | 7/1984 | Zodrow | 156/565 X |
| 4,662,624 | 5/1987 | Focke | 271/157 |
| 5,024,348 | 6/1991 | Kronseder | 221/11 |

FOREIGN PATENT DOCUMENTS

| | | |
|---|---|---|
| 0537823 | 4/1993 | European Pat. Off. . |
| 2631011 | 11/1989 | France . |
| 3536294 | 4/1987 | Germany . |
| 3630925 | 3/1988 | Germany . |

*Primary Examiner*—James Engel
*Attorney, Agent, or Firm*—Nils H. Ljungman and Associates

[57] ABSTRACT

A labelling machine has an apparatus for the automatic loading of the main magazine of a labelling machine with a label stack including of a number of individual labels. The label stack can be inserted from a supply magazine by means of a feed device into the main magazine, which supply magazine makes possible both a smaller size and a smooth insertion of the label stack into the main magazine, because the supply magazine can be pivoted from a standby position into an insertion position, in which an ejection opening of the supply magazine is flush against the insertion opening of the main magazine.

19 Claims, 15 Drawing Sheets

LABELLING MACHINE AND APPARATUS FOR THE AUTOMATIC LOADING OF THE MAIN MAGAZINE OF A LABELLING MACHINE, AND A SUPPLY MAGAZINE WHICH CAN BE USED IN SUCH AN APPARATUS

BACKGROUND OF THE INVENTION

1. Field of the Invention

The present invention generally relates to an apparatus for the automatic loading of a main magazine of a labelling machine with a label stack having a number of individual labels. The label stack can be inserted into an insertion opening of the main magazine from a supply or storage magazine, by means of a feed or advance device. The present invention also generally relates to a supply magazine which can be used in devices such as that described above.

2. Background Information

Devices and supply magazines of the type described above can make it possible to operate labelling machines virtually without interruption over a long period of time, without the need for the operator to refill the main magazine with new labels for relatively long periods of time.

An apparatus of the type described above is disclosed, for example, in German Patent DE 35 36 294 C2, which corresponds to U.S. Pat. No. 5,024,348. In accordance with the apparatus disclosed in this patent, the supply magazines are oriented parallel to one another on a table-shaped sliding track, on which track the magazines are transported by means of an advance device. The advance device is located behind the main magazine of the labelling machine of which labelling machine the magazines and advance device are a part. The end surfaces of the stack of labels contained in the supply magazine are in contact, during the feeding movement of the supply magazines, with a guide rail which prevents the labels from falling out during the feeding movement. These guide rails are retracted when the supply magazine being used has reached the loading position behind the main magazine.

The advantage of such an apparatus is that, due to the table-shaped configuration of the supply magazine and the resulting very low height of the apparatus, it can be possible to arrange several label refill devices one on top of the other, as is frequently necessary for the multiple labelling of bottles. A disadvantage of this configuration is that it can require a large table-shaped sliding surface, and this surface must be proportionately larger, as the number of supply magazines to be placed in a ready position on the sliding surface increases. An additional disadvantage of this apparatus is that the large sliding surface can make access to the advance mechanism underneath it more difficult. In addition, it has been determined in practical testing of known devices, such as that described above, that problems can frequently occur during the insertion of a new label stack into the main magazine.

To prevent individual labels in the stack of labels in the supply magazine from falling out, German Patent Specification No. 36 30 925 C2 discloses that there are detachable adhesive strips, by means of which the end surface of the first label of the label stack in the supply magazine are connected to the walls of the supply magazine. These adhesive strips are removed immediately before the label stack is inserted into the main magazine. During the introduction of the label stack into the main magazine, the use of adhesive strips can complicate the handling of the supply magazine.

OBJECT OF THE INVENTION

The object of the present invention is to reduce the space required for the installation and operation of an apparatus of the type described above, to thereby simplify the automatic refilling of the main magazine, and to simultaneously reduce the risk of a disruption of the insertion process.

SUMMARY OF THE INVENTION

The present invention teaches that this object can be achieved if the supply magazine can be pivoted out of a standby position into an insertion position, in which insertion position an ejection opening of the supply magazine can be in contact with an insertion opening of the main magazine. The present invention teaches that the supply magazines can preferably remain in a standby position as long as the main magazine is sufficiently full, and once the main magazine needs refilled, for example when the main magazine is only 1/10 or 1/2 full, the supply magazines can be pivoted out of the standby position into a filling position, in order to fill the main magazine with new labels. The pivoting capability of the supply magazines can make it possible to hold the supply magazines in a position which is at an angle with respect to the transport surface of the main magazine. In this manner, the amount of space required for the refilling process can preferably be reduced. This is true, in particular, if the supply magazines are suspended in their standby position. In this case, the individual labels can be prevented by their own weight from falling out of the supply containers. This is true in particular when, with a horizontal orientation of the main magazine, the supply magazine is vertically oriented in its standby position. The pivoting capability of the supply magazines can also make it possible to pivot the supply magazine to a point where it is essentially directly in front of the insertion opening of the main magazine, so that the new stack of labels can be smoothly transferred into the main magazine from the supply magazine, and so that the label stack will essentially always be guided during its transfer into the main magazine. This measure can reduce the risk of a problem caused by the slipping of individual labels during the insertion process.

Ease of operation with a simultaneous further reduction in the space requirement for the apparatus in accordance with the present invention can be achieved if several identical supply magazines are held by arms of a magazine support. The supply magazines can then preferably be transported into their pivoting position by means of their corresponding arms. For example, the supply magazines can be located on a carousel-like magazine support, on which support the supply magazines can be easily loaded and monitored. Other arrangements of the supply magazines on the magazine support are also conceivable, in particular a linear arrangement wherein the supply magazines can be located next to one another. The magazine support thereby transports each of the supply magazines, as necessary, into its pivoting position in the vicinity of the main magazine, from which position the supply magazines can be pivoted from the standby position into the insertion position. A particularly simple mechanism for pivoting the supply magazine can be used if the supply magazines are suspended on the arms of the magazine support.

An additional improvement of the smooth transition of the label stack from the respective supply magazine into the main magazine can be achieved if the supply magazines, at least in the area in which the labels are supported during the insertion into the main magazine, have projections in the vicinity of their ejection opening. The projections of the supply magazines, in the insertion position, can preferably be engaged in corresponding recesses of the main magazine.

An unintentional discharge of the labels from the label stack during the pivoting of the respective supply magazine or during the insertion of the labels into the main magazine can preferably be prevented by retaining elements. The retaining elements, in the standby position and at least over a portion of the distance travelled during the insertion of the label stack into the main magazine, can preferably prevent an unintentional discharge of the labels from the label stack from the supply magazine. In addition, the retaining elements can then automatically release the label stack at the appropriate time. When such retaining elements are used, the stack of labels can be held together securely, both when the supply magazines are in the standby position and during their pivoting movement, as well as during the critical phase at the beginning of the insertion of the label stack into the main magazine, thereby essentially guaranteeing a smooth pivoting movement and insertion at all times.

In accordance with a preferred embodiment of the present invention, the label stack can preferably be securely held together, which promotes a smooth insertion of the label stack into the main magazine, and the system can be designed so that essentially only a small amount of space is required during the insertion phase. The system can thus be equipped with a supply magazine for the automatic loading of a label stack, the label stack having a number of labels, into a main magazine of a labelling machine. The supply magazine can be equipped with retaining means which prevent the label stack from falling apart before the label stack is inserted into the main magazine, thereby essentially guaranteeing that the retaining means can be inserted together with the respective label stack into the main magazine. The retaining elements, during the insertion of the label stack into the main magazine, can preferably exert a retaining force on the label stack opposite to the insertion force. In addition, the retaining elements can automatically pivot away from the end surface of the label stack, preferably immediately before reaching the end of the insertion travel. In this manner, the label stack can be prevented from falling apart before reaching the end of the insertion travel, and, during the insertion, the label stack can form a unit which can be easily controlled. When such supply magazines are used, not only is the smooth insertion of the label stack promoted, but it can also become possible to conserve space, which space is typically required for additional known safety elements. The purpose of these safety elements is preferably to prevent a disruption of the individual labels, which can slip, e.g. at least during the transport of the supply containers to the main magazine.

In accordance with a preferred embodiment of the present invention, the retaining elements can preferably be designed generally in the form of leaf springs. The leaf springs can be oriented axially parallel to the longitudinal axis of the label stack and can be disposed on the sides of the label stack. In addition, the leaf springs can preferably be bent in a direction generally perpendicular to the longitudinal axis of the label stack, and can simultaneously be used for the lateral guidance of the label stack.

On account of the flexibility of the leaf-spring-like retaining elements in a direction generally perpendicular to their longitudinal axis, the automatic pivoting of the retaining elements away from the end surface of the label stack can easily be accomplished. Thus, for example, the pivoting of the retaining elements away from the end surface of the label stack can be accomplished by a guide element located at the end of the insertion travel of the retaining elements on the main magazine.

To facilitate the interaction of the guide elements of the main magazine and of the retaining elements of the supply magazine, the retaining elements, on their tip corresponding to the end surface of the label stack, can have at least one segment which projects in a direction generally away from the label stack. This at least one segment can preferably have an outwardly rounded, funnel shape. This segment, when it encounters the guide element of the main magazine, can preferably cause the retaining element to pivot away from the end surface of the label stack in order to release the labels into the main magazine. The guide element of the main magazine can preferably include a roller supported by a journal bearing.

Finally, it is favorable if the retaining elements can be retracted into their starting position by means of tensile or tension springs. One end of the springs can preferably be fastened to one of the walls of the supply magazine, and the other end of the springs can be fastened to its corresponding retaining element. These springs can, on one hand, exert the force necessary to maintain the cohesion of the label stack during its insertion into the main magazine by means of the retaining elements. In addition the springs can, on the other hand, essentially guarantee that the retaining elements, after they are pivoted away from the end surface of the label stack, will be essentially automatically retracted into their initial position. As such, the respective supply magazine, after the completion of the insertion movement, can be easily pivoted back into the standby position, and the main magazine can be refilled from a new supply magazine.

It is particularly advantageous if the supply magazines are used in a device of the type described above.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

To summarize, one aspect of the invention resides broadly in a labelling machine and apparatus for the automatic filling of the main magazine of a labelling machine with a label stack having of a number of individual labels, which label stack can be inserted from a supply magazine, by means of a feed device, into the main magazine via an insertion opening in the main magazine, wherein the supply magazine can have an ejection opening and can be pivoted from a standby position into an insertion position, in which the ejection opening is in substantial contact with the insertion opening of the main magazine.

Another aspect of the invention resides broadly in a method of filling a main magazine of a labelling machine with a label stack including a number of individual labels by means of a filling apparatus, the filling apparatus comprising: a plurality of supply magazines each having an ejection opening, and being moveable between a standby position and an insertion position; a feed device for inserting the label stack from the supply magazines into the main magazine of the labelling machine, the main magazine having an insertion opening, and means for pivoting the supply magazines between the standby position and the insertion position; said method comprising the steps of: providing a labelling machine having a main magazine, the main magazine having an insertion opening; providing a filling apparatus; the step of providing the filling apparatus further comprising providing a plurality of supply magazines each having an ejection opening and being moveable between a standby position and an insertion position; providing a feed device; the method further comprising the steps of: loading the supply magazines with a stack of labels; pivoting the supply magazine to be unloaded from the standby position to the insertion position, with the pivoting means, to dispose the ejection opening of the supply magazine adjacent the insertion opening of the main magazine; and inserting the label stack from the supply magazine into the insertion opening of the main magazine, with the feed device.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENT

Figure 1:
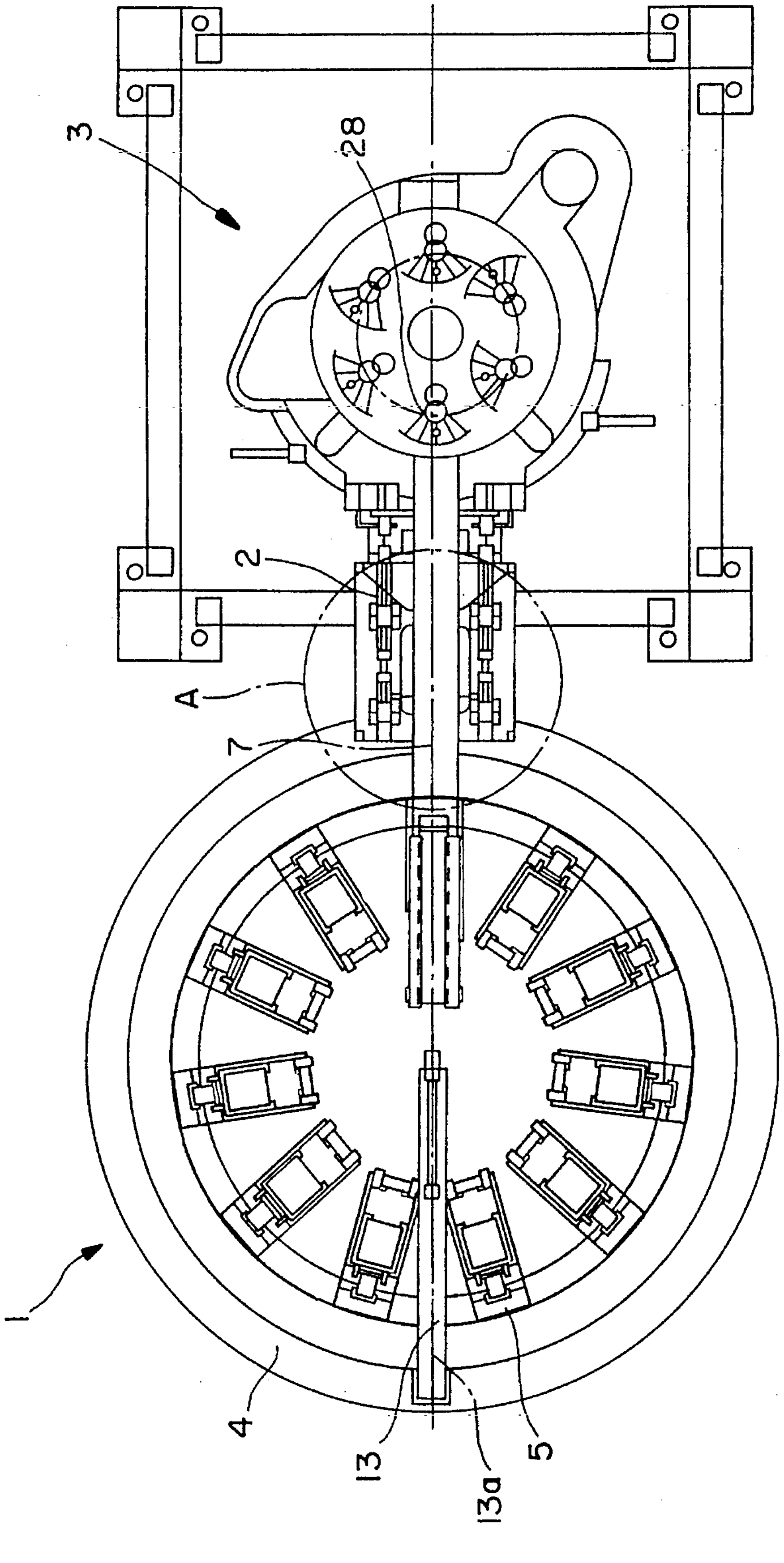
FIG. 1 illustrates an apparatus for the automatic filling of the main magazine of a labelling machine, in a plan view.
Figure 2:
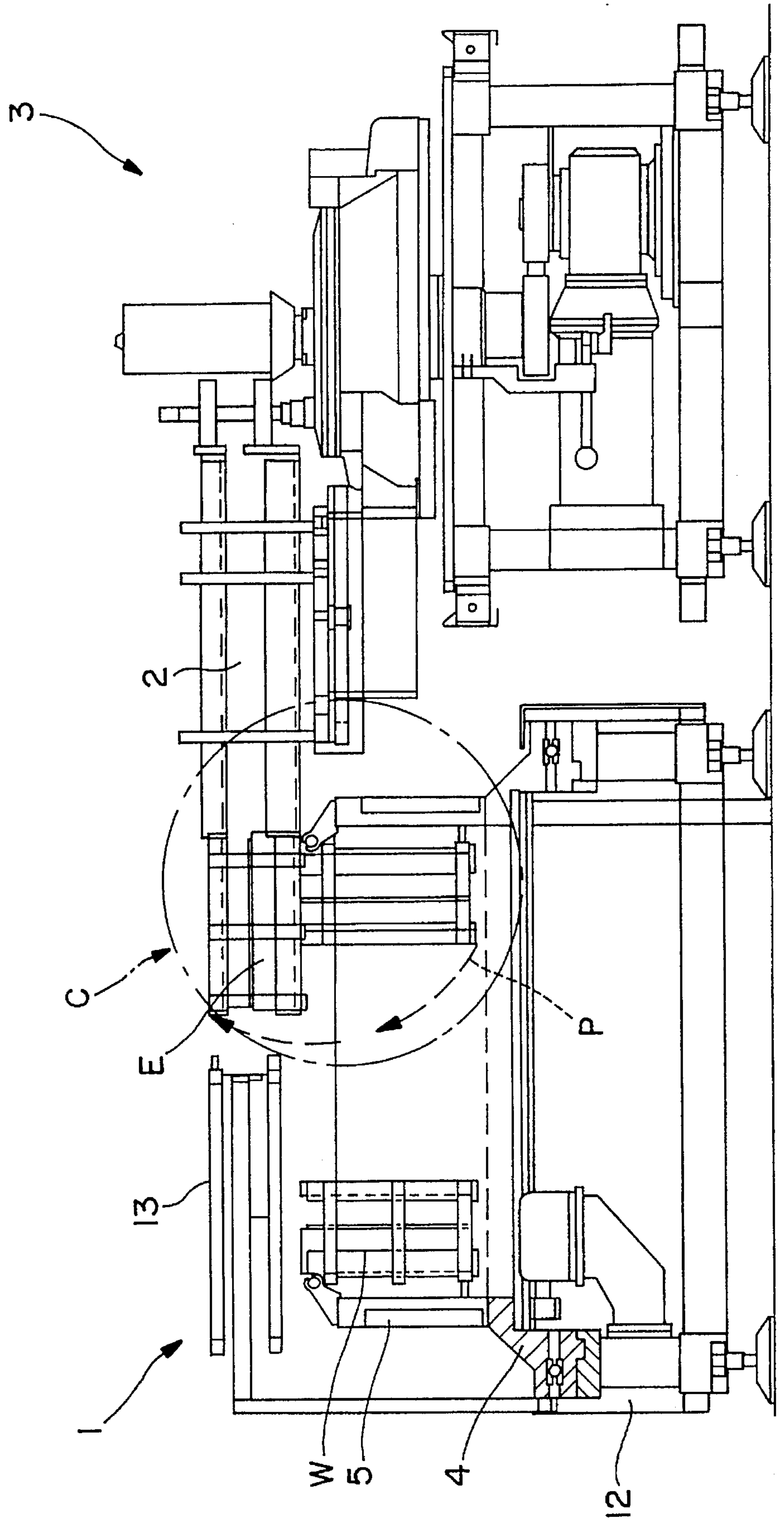
FIG. 2 is a side view of the apparatus illustrated in FIG. 1.

FIGS. 1 and 2 show an apparatus 1 for the automatic filling of a main magazine 2 of a labelling machine 3. The apparatus 1 can preferably have a frame 12 as shown in FIG. 2. FIGS. 1 and 2 show a carousel-type, rotating magazine support 4, on which there can preferably be retaining arms 5 located generally in a circle next to one another and at regular intervals with respect to one another.

In accordance with one embodiment of the present invention, there can preferably be eleven retaining arms 5 located on the magazine support 4, however, a greater or lesser number of arms 5 would be within the scope of the present invention.

Figure 3:
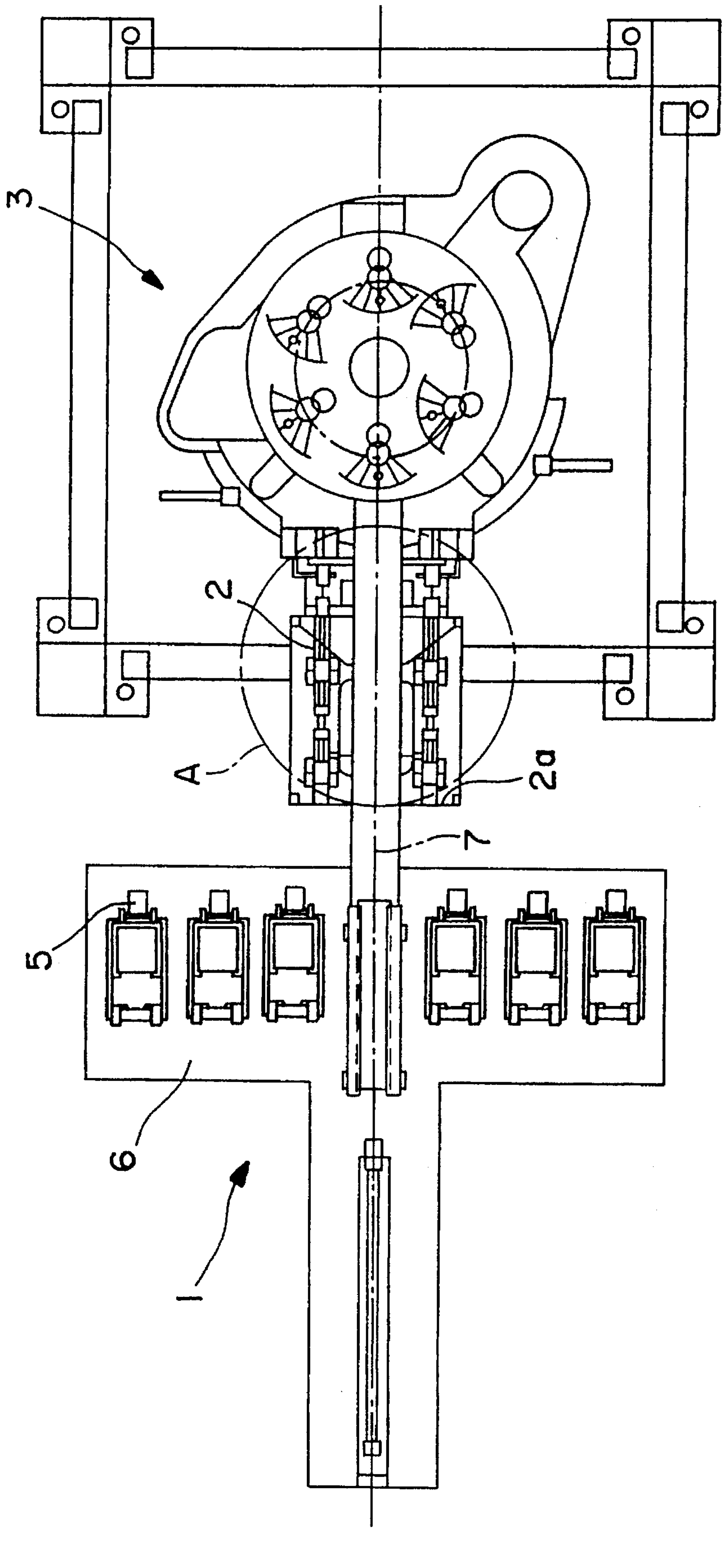
FIG. 3 illustrates an alternative realization of an apparatus for the automatic filling of the main magazine of a labelling machine, in a plan view.

The apparatus illustrated in FIG. 3 differs from the apparatus illustrated in FIGS. 1 and 2 in that in the device illustrated in FIG. 3, a magazine support 6 is substantially rectangular, and the retaining arms 5 are arranged in a substantially linear fashion, at regular intervals next to one another. In accordance with the embodiment shown in FIG. 3, the magazine support 6 can preferably be moved at right angles with respect to a longitudinal axis 7 of the main magazine 2.

Figure 2A:
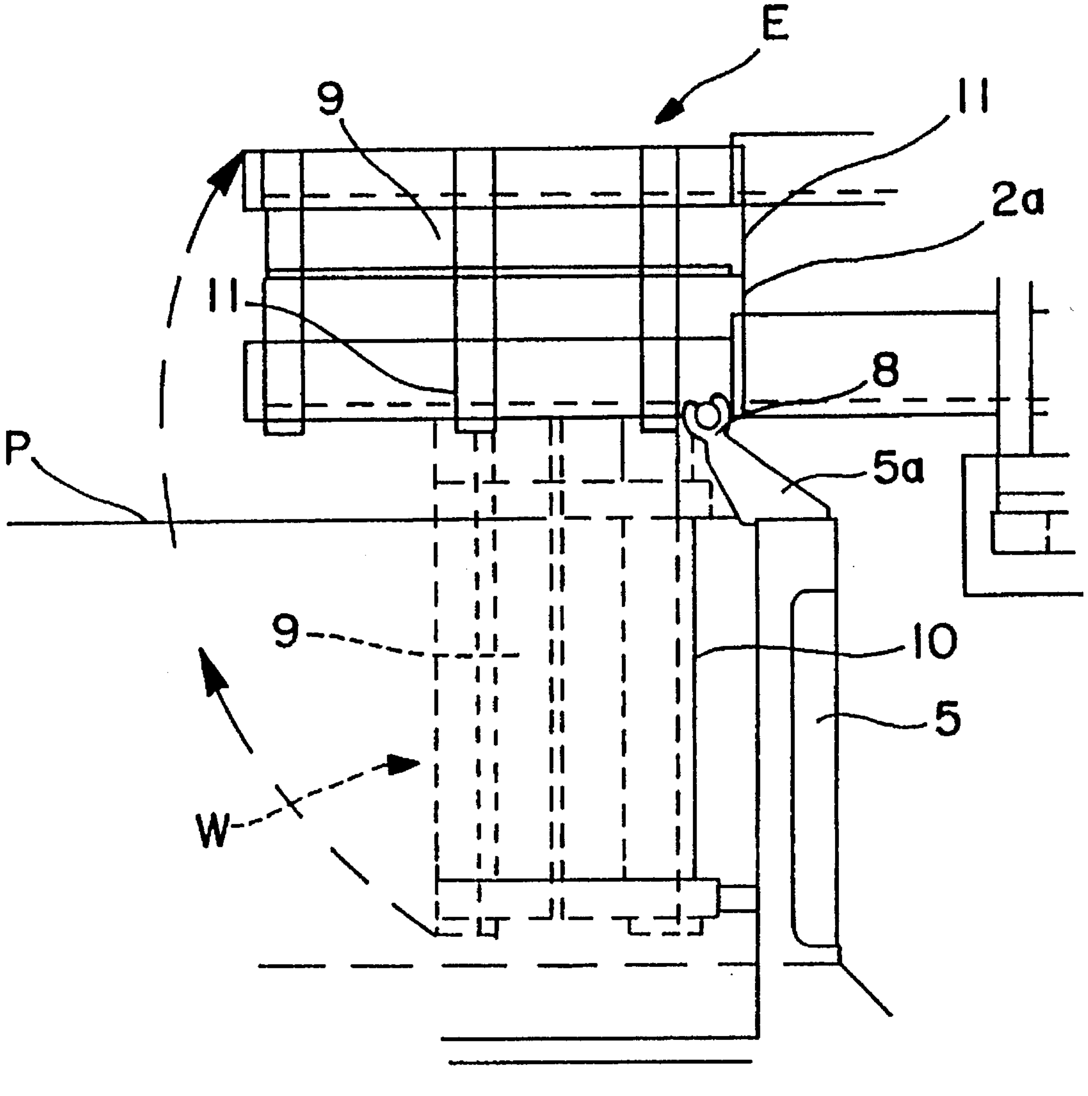
FIG. 2*a* illustrates a detail C of FIG. 2, in an enlarged side view.

The retaining arms 5 illustrated in FIGS. 1, 2 and 3 can each have a cropped or tapered upper segment 5*a* (see FIG. 2*a*), at the tip of which segment 5*a* there can be a pivoting device 8. One possible embodiment of the pivoting device 8 is shown in FIG. 2*c*.

A supply magazine 9 can preferably be provided, to hold a stack of labels 18 (see FIG. 8) to be loaded into the main magazine 2. The supply magazine 9 can preferably have an ejection opening 11 at one end thereof, through which opening 11 the labels can be discharged. The supply magazine 9 can be fastened to the pivoting device 8 by means of a pivot element located on a base surface 10, and facing the ejection opening 11 of the supply magazine 9. One example of such a pivot element is shown in FIG. 2*c* and is labelled 9*a*. By means of the pivoting device 8, the supply magazine 9 can be pivoted from its substantially vertically-oriented, suspended standby position W into a substantially horizontally-oriented, insertion position E. The corresponding pivoting movement is indicated in FIGS. 2, 2*a*, and 2*c* by arrows P, whereby in FIGS. 2*a* and 2*c*, the supply magazine 9 is shown in its suspended standby position W by broken lines, and in its insertion position E by solid lines. Further details regarding how the supply magazines 9 are pivoted between these two positions W and E can be found herebelow.

Figure 1A:
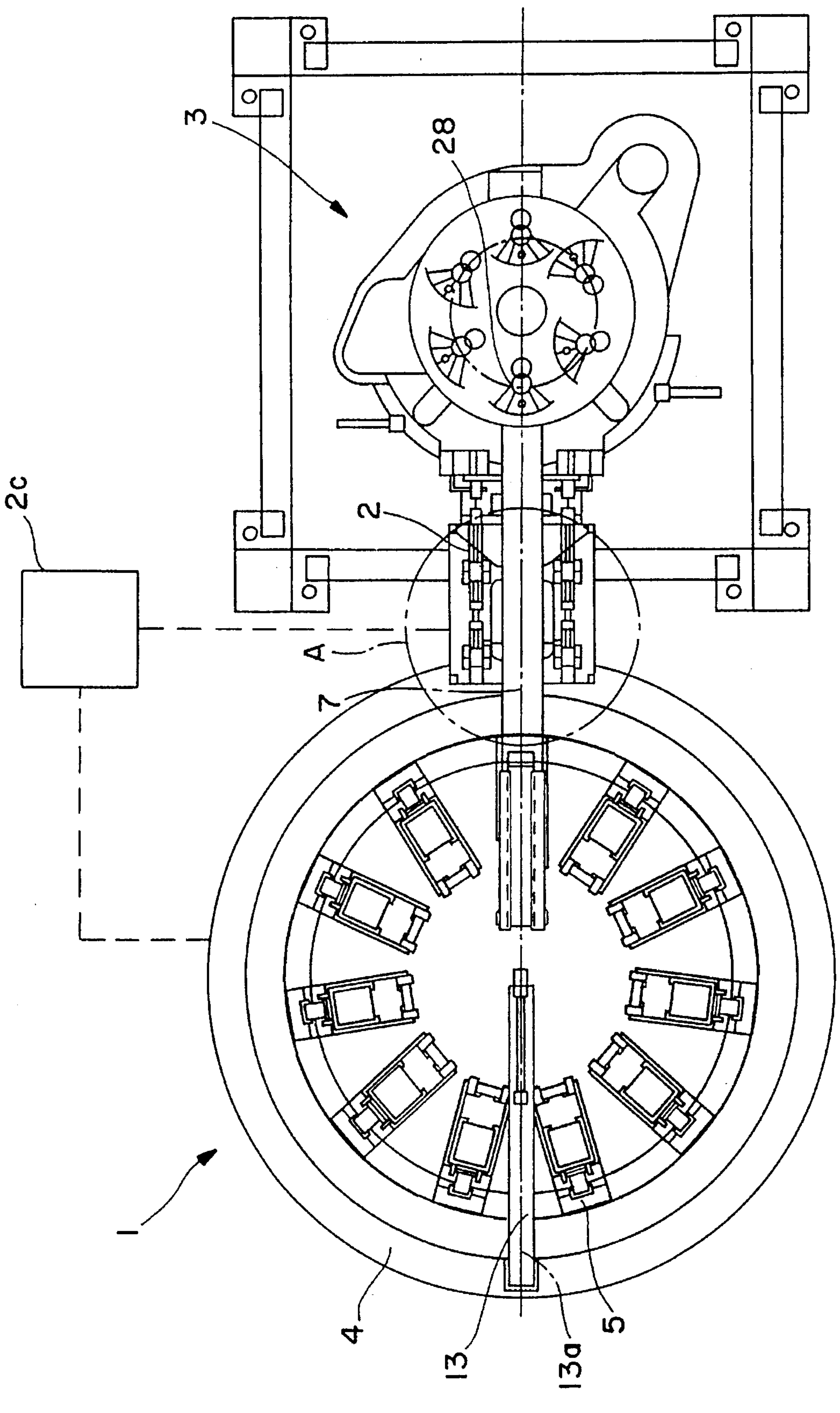
FIG. 1*a* shows substantially the same view as FIG. 1, but shows additional components.

Above the retaining arms 5, there is an insertion tappet 13 having a longitudinal axis 13*a* (see FIG. 1*a*), which tappet 13 can preferably be supported by the frame 12 of the apparatus 1. The insertion tappet 13 can be ejected pneumatically from a standby position toward the main magazine 2 by means of a pneumatic arrangement 40, shown schematically in FIG. 2*b*. The longitudinal axis 13*a* (see FIG. 1*a*)

of the insertion tappet 13 can preferably be aligned with the longitudinal axis 7 of the main magazine 2. The length of the insertion tappet 13 should therefore be sized so that in the standby position (i.e. when the insertion tappet 13 is disposed away from the main magazine 2), there is sufficient space between the insertion tappet 13 and the main magazine 2 to allow for the pivoting of the supply magazines 9 into their insertion position E.

Figure 8:
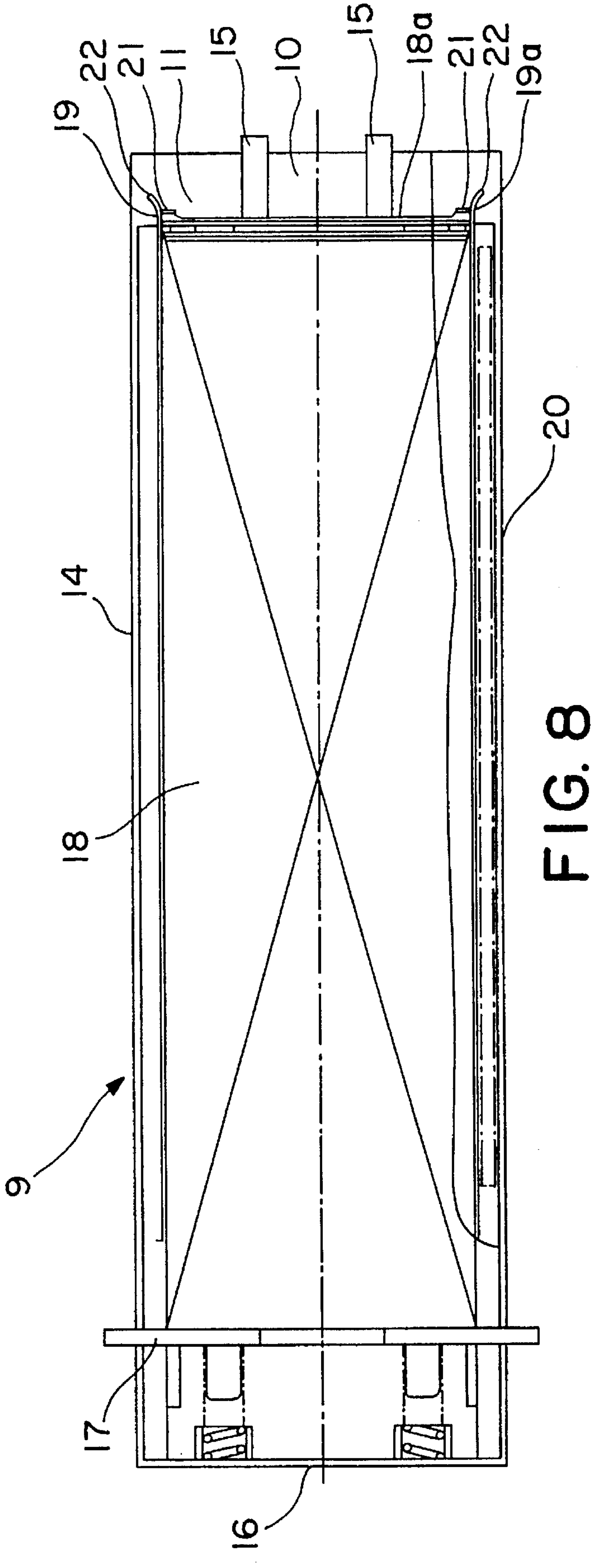
FIG. 8 shows an overhead view of a supply magazine used in one of the devices illustrated in FIGS. 1 or 3.

As shown in FIG. 8, each of the supply magazines 9 can be shaped generally like a box, and in addition to the base surface 10 can have side walls 14. The side walls 14 can preferably be disposed perpendicularly with respect to the base surface 10. Also located on the base surface 10 there can preferably be slide rails 15 which can project through the ejection opening 11 and beyond the forward edge of the base surface 10. In the insertion position E of the supply magazines 9, the segment of the slide rails 15 which projects beyond the forward edge of the base surface 10 can preferably be engaged in corresponding recesses 2*b* (see FIGS. 5*c* and 5*d*) of the main magazine 2. In accordance with one embodiment, the slide rails 15 can preferably extend along the entire longitudinal extent of the base surface 10, or alternatively, can be disposed only on the forward portion of the base surface 10, adjacent the ejection opening 11.

Each supply magazine 9 can also preferably have a rear wall 16, as well as a plate 17. The plate 17 can be biased with respect to the rear wall 16, for flexibly supporting a label stack 18 (see FIG. 8) loaded into the respective supply magazine 9 when the supply magazine 9 is in the standby position W. This arrangement of the plate 17 can make it possible to load label stacks 18 of different lengths into the supply magazines 9, since, due to the spring-mounted support of the plate 17, which can be provided by a biasing means or springs 17*a* (see FIG. 8*a*), it can essentially be guaranteed that an end surface 18*a* (see FIG. 8) of the label stack 18 is located in a specified location of the ejection opening 11 of the supply magazine 9.

In accordance with one embodiment, rear wall 16 can preferably have an opening 16*a* (see FIG. 8*a*), into which the insertion tappet 13 can preferably extend during loading of the main magazine 2. Likewise, the plate 17 can also preferably have an opening 17*b* (see FIG. 8*a*) substantially axially aligned with opening 16*a*, to permit the insertion tappet 13 to contact the label stack 18 in order to push the label stack 18 into the main magazine 2. In addition, in accordance with one embodiment, plate 17 can preferably generally have the shape of a "T", and can thus have two projections 17*c* (see FIG. 8*a*) which can be guided along the sides 14 of the magazine 9.

Each supply magazine 9 can also be equipped with retaining elements 19 disposed along the inside of each side 14 of the magazine 9. The retaining elements 19 can preferably extend inside the supply magazine 9 on both sides of the label stack 18.

In addition, there can preferably be tensile or tension springs 20 which extend along the retaining elements 19. The tension springs 20 can be fastened by means of their one end to an end 19*a* of the retaining elements 19 corresponding to the ejection opening 11, and by means of their other end to a rear section 14*a* (see FIG. 8*a*) of the side walls 14. These tensile or tension springs 20 can preferably exert a spring force on the corresponding retaining elements 19 in a direction towards the rear end 14*a* to hold the label stack 18 against the plate 17.

Figure 8A:
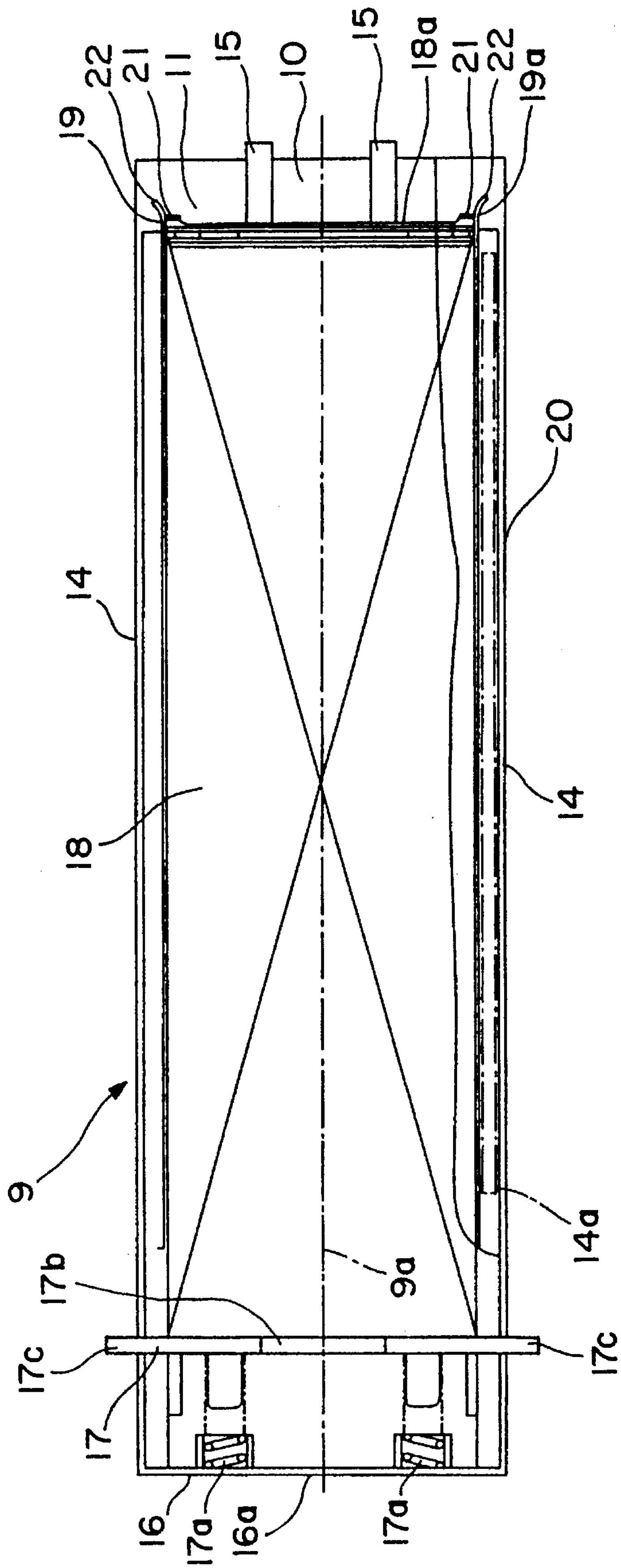
FIG. 8*a* shows substantially the same view as FIG. 8, but shows additional components.

The retaining elements 19 can be designed generally in the form of leaf springs, and can be flexibly bent at least in the vicinity of their end 19*a* in a direction perpendicular to their longitudinal axis, i.e. in a direction generally perpendicular to a longitudinal axis 9*a* of the supply magazine 9 (see FIG. 8*a*). On their end 19*a*, the retaining elements 19 can each have projections 21 which point toward the inside of the supply magazine 9, or towards axis 9*a*, which projections 21 can preferably be in contact with the end surface 18*a* of the label stack 18 and can prevent an accidental discharge of individual labels of the label stack 18 from the supply container 9. On the end 19*a* of the retaining elements 19, there can be an outwardly rounded, funnel-shaped, portion or segment 22, which segment 22 generally points away from the label stack 18 (i.e. in a direction away from axis 9*a*).

In accordance with one embodiment of the present invention, the supply magazine 9 can be open on one side, i.e. on the side opposite the base surface 10, since the labels can preferably be held in place by means of the plate 17 and the retaining elements with their projections 21. In accordance with this particular embodiment, the projections 17*a* of the plate 17 can preferably extend at least partially out of the magazine 9 through this open side. However, in accordance with an alternative embodiment, there can preferably be an additional surface opposite base surface 10, which additional surface would be substantially similar to base surface 10.

Figure 2B:
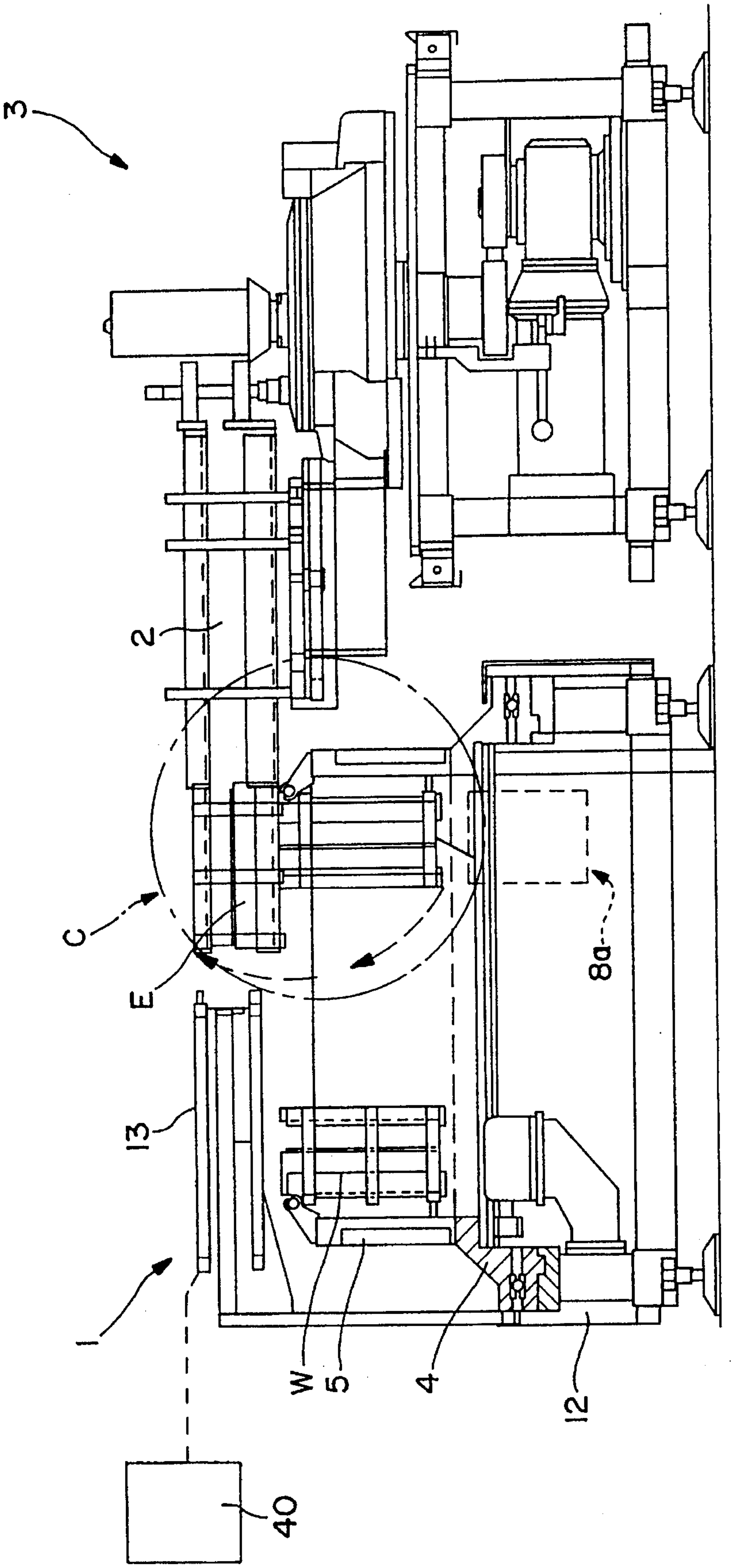
FIG. 2*b* shows substantially the same view as FIG. 2, but shows additional components.
Figure 2C:
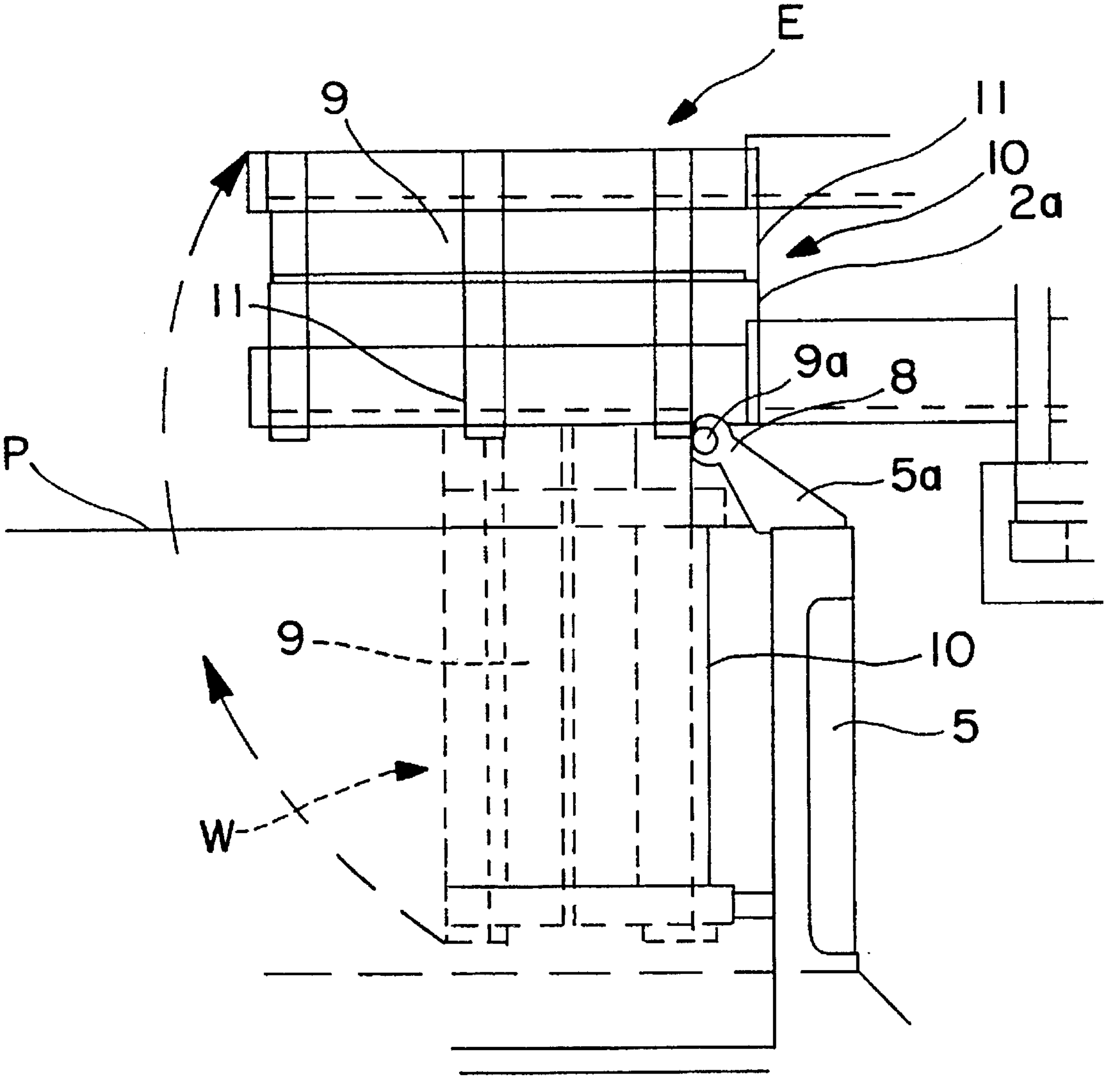
FIG. 2*c* shows substantially the same view as FIG. 2*a*, but is more detailed.

In accordance with one embodiment of the present invention, as shown in FIG. 2*b*, there can preferably be a mechanism 8*a* (shown schematically only) which can work in conjunction with the pivoting device 8. The mechanism 8*a* can preferably include a member not shown here, but which should be understood from the following description, which member can be disposed between the base surface 10 of the supply magazine 9 to be unloaded and its corresponding retaining arm 5. The member can preferably be approximately the same height as the retaining arm 5 and can move in at least two directions along the support 4, 6, i.e. towards and away from the main magazine 2. When the supply magazine is to be pivoted into its loading or insertion position E, the member can preferably move away from the main magazine 2, and can act on base surface 10 of the supply magazine 9 to pivot the supply magazine 9 from its standby vertical position W to its insertion position E, preferably by means of the pivoting device 8. The member can then be moved back to its initial position, i.e. towards the main magazine 2, when the supply magazine 9 has been unloaded to permit the supply magazine 9 to move back into its vertical standby position W.

Figure 8B:
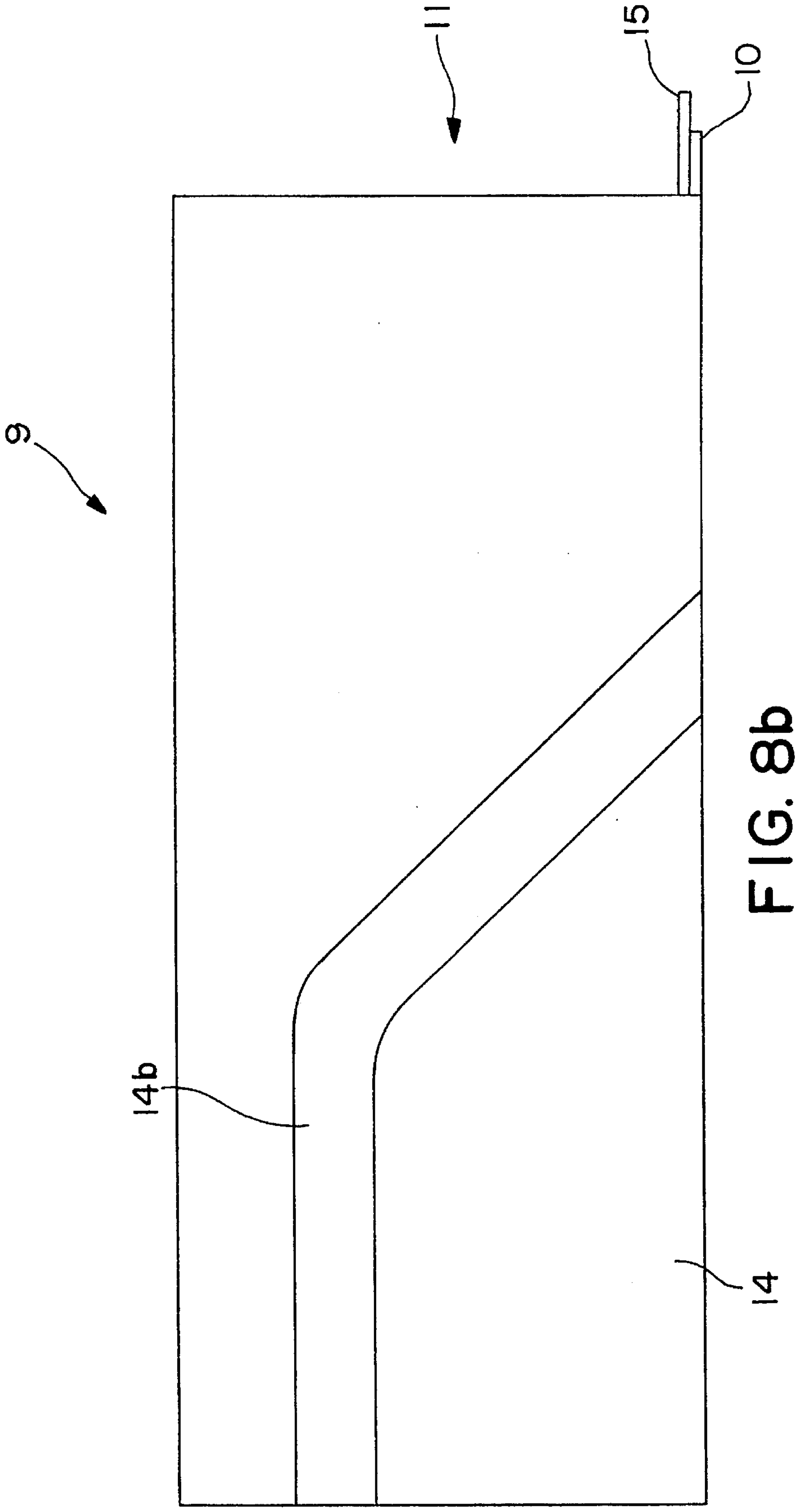
FIG. 8*b* shows a side view of a supply magazine having a cam surface thereon.

In accordance with an additional embodiment of the present invention, the mechanism 8*a* can possibly include a member not shown here but which should be understood from the following description, which member can preferably move in an up and down motion with respect to support 4, 6. This member can preferably engage in a cam surface 14*b* shown in FIG. 8*b*, which cam surface 14*b* can be located on at least one side wall 14 of the supply magazine 9. The supply magazine shown in FIG. 8*b* is shown in its loading or insertion position E. The member can thus be moved upwards and can engage the cam surface 14*b* of side wall 14, and as the member moves upwards, the supply magazine 9 can preferably be pivoted upwards into its loading or insertion position E, preferably due to the configuration of the cam surface 14*b*. The member can then be retracted downwards in order to permit the supply magazine 9 to be pivoted back into its standby position W.

In accordance with yet another embodiment of the present invention, the pivoting device 8 could possibly include a gear wheel which can be disposed adjacent the supply magazine 9 in its standby position E. The pin 9*a* of the base surface 10 of the supply magazine can preferably have teeth which are engaged with the gear wheel. Thus, to pivot the supply magazine 9 into its loading or insertion position E, the gear wheel can be rotated by a shaft or other device by a predetermined amount and can thereby engage the teeth of the pin 9*a* to rotate the pin 9*a* and thereby move the supply magazine 9 into its insertion position E. Once the labels have been loaded into the main magazine 2 from the supply magazine 9, the gear wheel can then be rotated in the opposite direction in order to pivot the supply magazine 9 back into its standby position W.

In accordance with yet another embodiment of the present invention, there can preferably be a motor, such as an electric motor, directly connected to the pivoting device 8, which motor can preferably cause the pivoting device 8 to pivot the supply magazine 9 into the desired position. In accordance with this embodiment, there can preferably be a substantially rigid connection between the pivoting device 8 and the supply magazine 9.

Figure 4A:
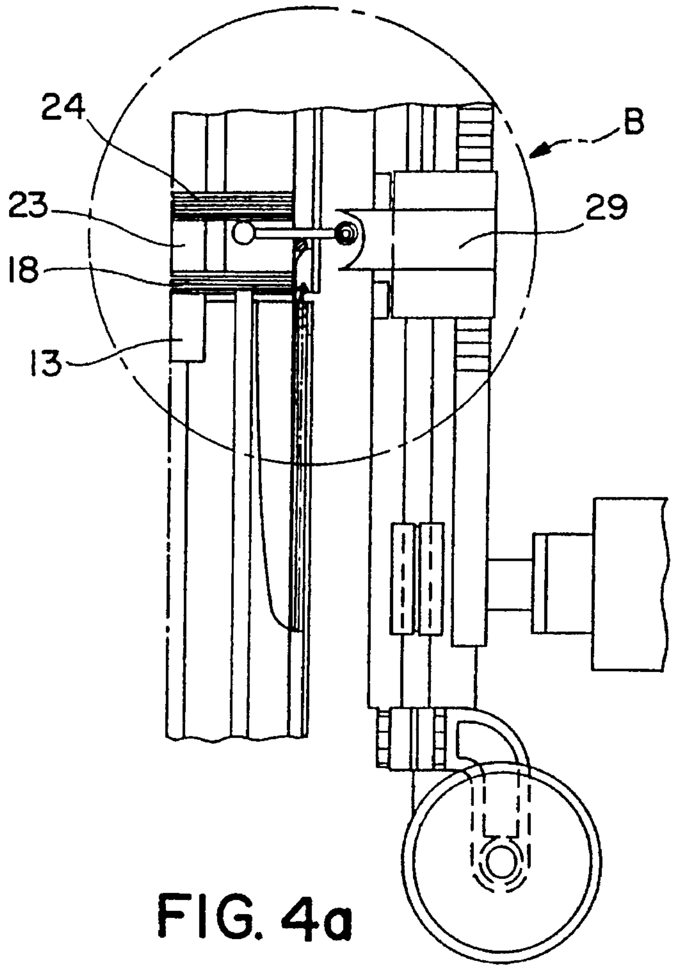
FIG. 4*a* shows a detail A of the apparatus illustrated in FIGS. 1 or 3, in an enlarged overhead view, in a first position of the apparatus during the insertion of a new label stack.
Figure 4B:
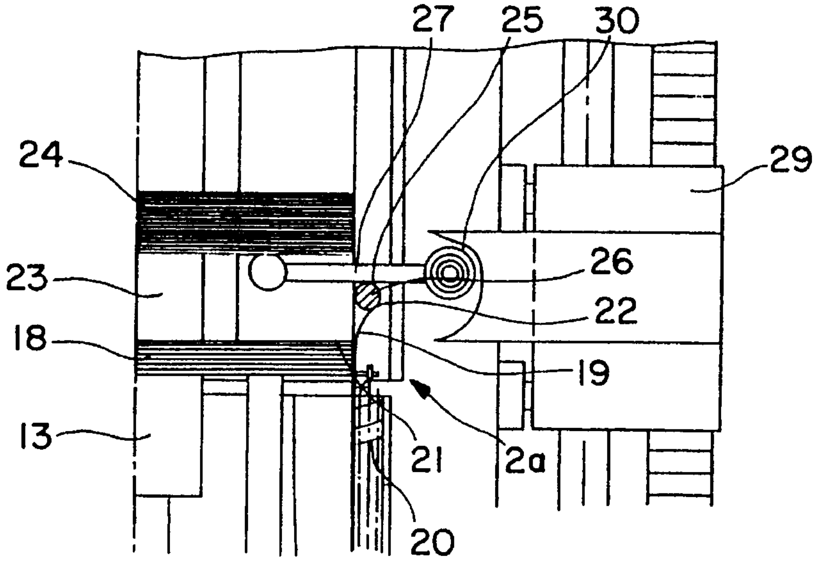
FIG. 4*b* shows a detail B of FIG. 4*a*, in a further enlarged overhead view.

As shown in FIGS. 4*a* and 4*b*, the main magazine 2 can preferably have a guide rail 23 for guiding a label stack 24 inserted into the main magazine 2. In addition, the main magazine 2 can preferably have an insertion opening 2*a* (see FIG. 4*b*). In the vicinity of this insertion opening 2*a* of the main magazine 2, close to each of the two sides of the guide rail 23, there can preferably be a guide element 26, which guide element 26 can be designed in the form of a roller 25 supported by a journal bearing.

Inside the main magazine 2, the inserted label stack 24 can be transported by transport elements 27 toward gluing segments 28 (see FIGS. 1 and 1*a*) of the labelling machine 3. The transport elements 27 can therefore be fastened so that they can pivot on a transport device 29, and can each be held in contact with the inserted label stack 24 by means of a rotary spring 30.

The main magazine 2 can also be equipped with consumption sensors 2*c* (shown schematically only in FIG. 1*a*), which sensors 2*c* can monitor the consumption of the labels of the label stack 24 inserted into the main magazine 2. The consumption sensors 2*c* preferably report the need for refilling the main magazine 2 with a new label stack 18 with sufficient advance notice such that the main magazine 2*c* can essentially always contain a sufficient quantity of labels to operate the labelling machine 3 without interruptions, taking the refilling process into consideration. In accordance with one embodiment, the consumption sensors 2*c* can preferably be operatively connected to the supports 4, 6, so that the supports 4, 6 can move the next supply magazine 9 into position with respect to the main magazine 2, for refilling the main magazine 2.

In accordance with one embodiment of the present invention, the main magazine 2 can preferably be of such a length that it can hold about two times the amount of labels that each supply magazine 9 can hold, so that when the main magazine 2 is half-empty, as indicated by the consumption sensor 2*c*, another supply magazine 9 can be moved into its insertion position. Alternatively, the main magazine 2 could be of a lesser length and the consumption sensor 2*c* could then indicate that a refilling of the main magazine 2 is necessary when the label supply in the main magazine 2 is at about 1/10 of its maximum supply. Of course, other configurations would be within the scope of the present invention.

The apparatus described above can preferably function as follows:

As soon as the consumption sensors 2*c* of the main magazine 2 report that a refilling of the main magazine 2 is necessary, one of the supply magazines 9 can be transported by means of the magazine support 4, 6 into its pivoting position, in which the supply magazine 9 is preferably located essentially directly in front of the main magazine 2 of the labelling machine 3. The respective retaining arm 5 can thereby be located underneath the main magazine 2, in order to save space.

The respective supply magazine 9 can then be pivoted into the insertion position E (FIG. 2*a*), by means of the pivoting device 8 and the pivoting mechanism 8*a*, so that the supply magazine 9 can be substantially aligned horizontally with the main magazine 2. The ejection opening 11 of the supply magazine 9 is now in close contact with the insertion opening 2*a* of the main magazine 2, whereby the segments of the slide rails 15 which project into the main magazine 2 essentially guarantee that the new label stack 18 can be smoothly inserted into the main magazine 2.

It should be understood that FIGS. 4*a*–7*b* can preferably be considered to represent partial views (i.e. right side plan views) of the devices of FIGS. 1 and 3.

As shown in FIGS. 4*a* and 4*b*, the injection tappet 13 can then preferably move into the supply magazine 9, and can push the label stack 18 toward the main magazine 2. It should also be understood that the label stack 18 shown in FIGS. 4*a*–7*b* is shown smaller than actual size in order to illustrate the operation of the present invention in a compact drawing. The retaining elements 19 can thereby be driven towards the opening 2*a* of the main magazine 2, against the force of springs 20, by means of their projections 21. The projections 21 can thereby exert a force generated by the tensile springs 20 on the label stack 18, or on the end 18*a* of the label stack 18, until the end of the label stack 24 currently located in the main magazine 2 is approximately reached. In this position, the funnel-shaped segments 22 of the retaining elements 19 can preferably encounter the roller 25 of the respective guide element 26.

Figure 5A:
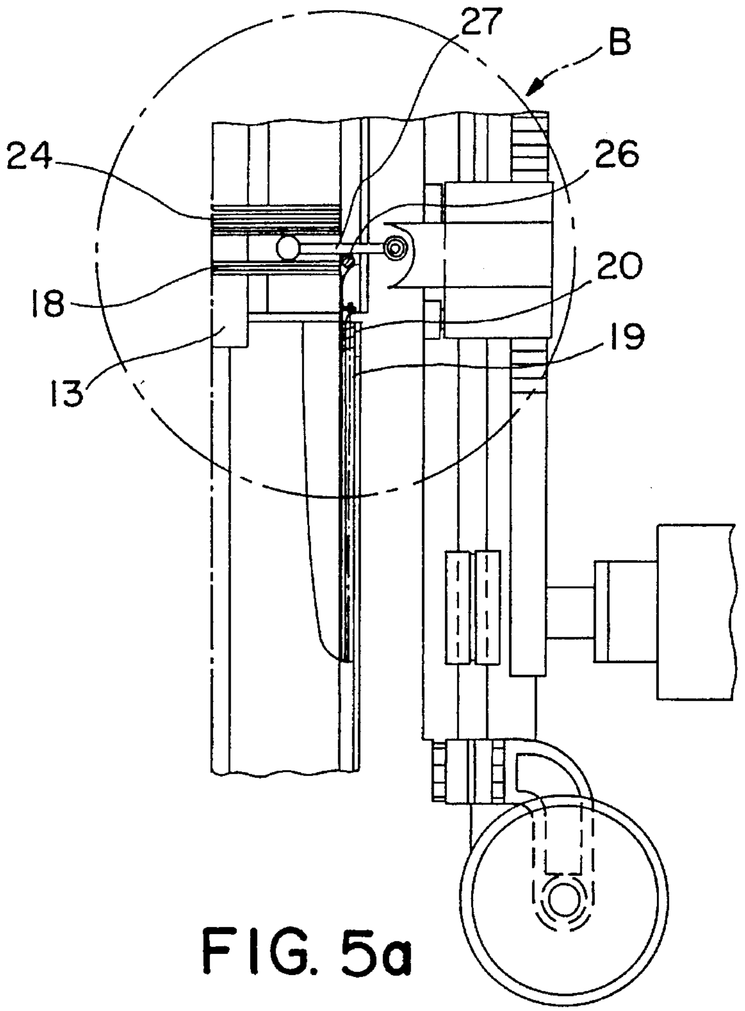
FIG. 5*a* shows a detail A of the devices illustrated in FIGS. 1 or 3 in a second position of the device during the insertion of a new label stack.
Figure 5B:
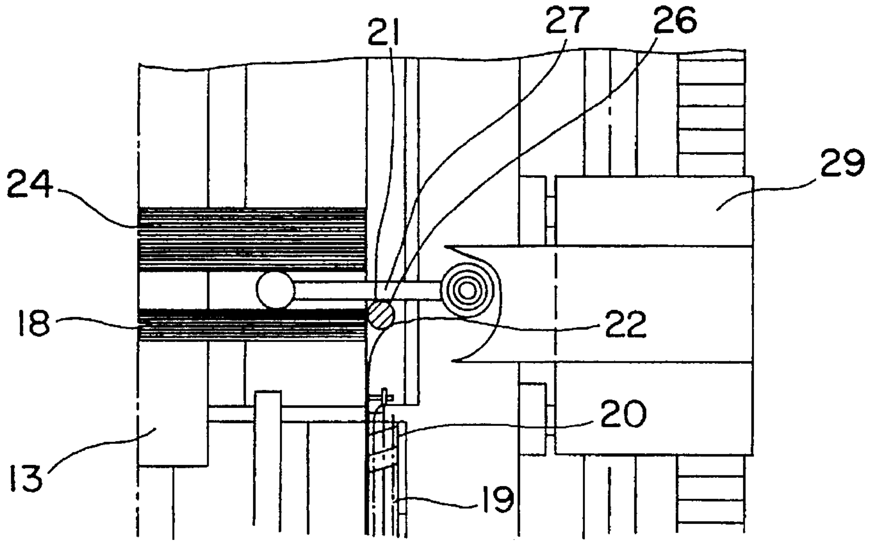
FIG. 5*b* shows a detail B of FIG. 5*a* in a further enlarged overhead view.
Figure 5C:
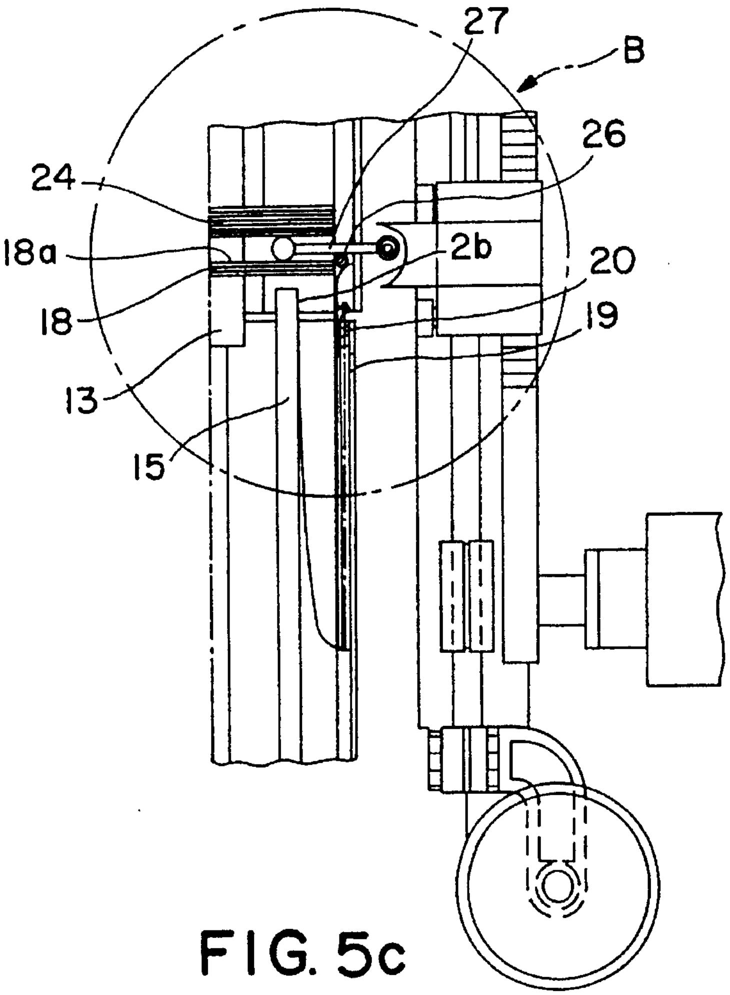
FIG. 5*c* shows substantially the same view as FIG. 5*a*, but is more detailed.
Figure 5D:
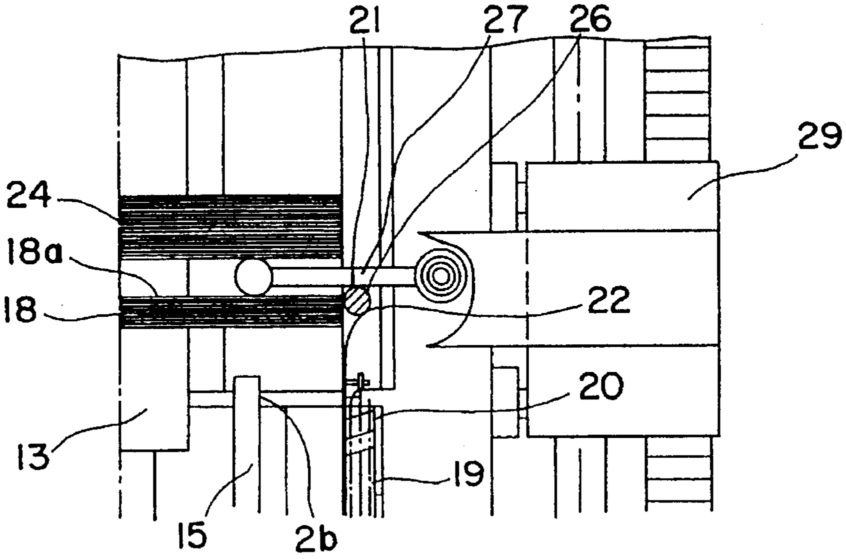
FIG. 5*d* shows substantially the same view as FIG. 5*b*, but is more detailed.

As shown in FIGS. 5*a* and 5*b*, the further insertion of the label stack 18 into the main magazine 2 can preferably cause the funnel-shaped segment 22 of the retaining elements 19 to be pushed away, i.e. to the right in the figure, from the label stack 18 by the guide element 26. The retaining element 19 can thus preferably be bent in a direction perpendicular to its longitudinal axis. This bending is accompanied by a pivoting of the projections 21 of the retaining elements 19 away from the end surface 18*a* of the label stack 18.

Figure 6A:
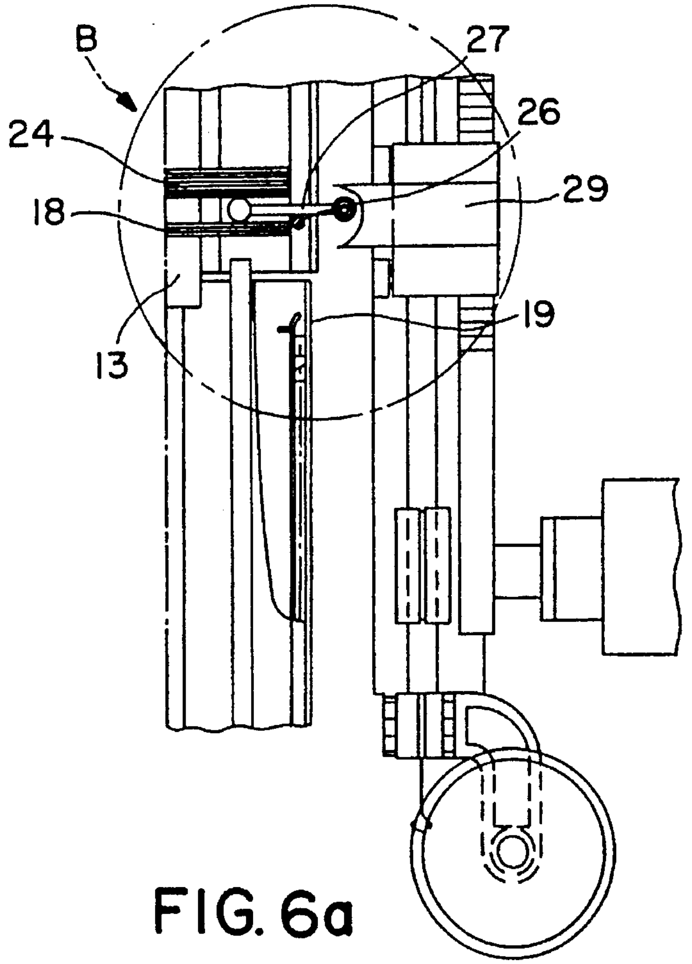
FIG. 6*a* shows a detail A of the devices illustrated in FIGS. 1 or 3 in a third position of the device during the insertion of a new label stack.
Figure 6B:
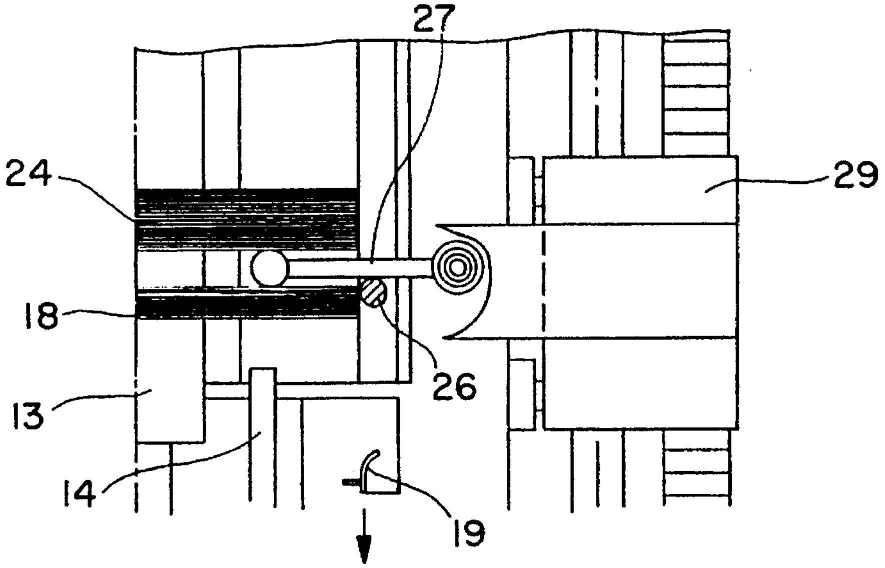
FIG. 6*b* shows a detail B of FIG. 6*a* in a further enlarged overhead view.

As shown in FIGS. 6*a* and 6*b*, as soon as the projections 21 are completely moved away from the end surface 18*a* of the label stack 18, so that the label stack 18 is free of the forces exerted by the retaining elements 19, the retaining elements 19, pulled by the tensile springs 20, can be quickly retracted into their initial position. The end surface 18*a* of the newly-inserted label stack 18 is now preferably in contact with the transport elements 27.

Figure 7A:
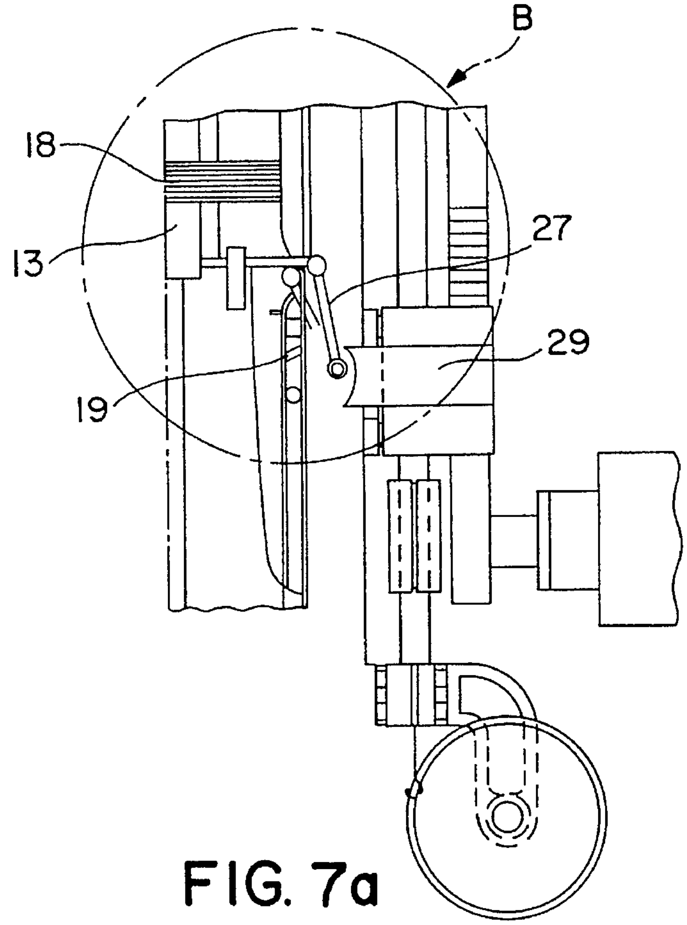
FIG. 7*a* shows a detail A of the devices illustrated in FIGS. 1 or 3 in a fourth position of the device during the insertion of a new label stack.
Figure 7B:
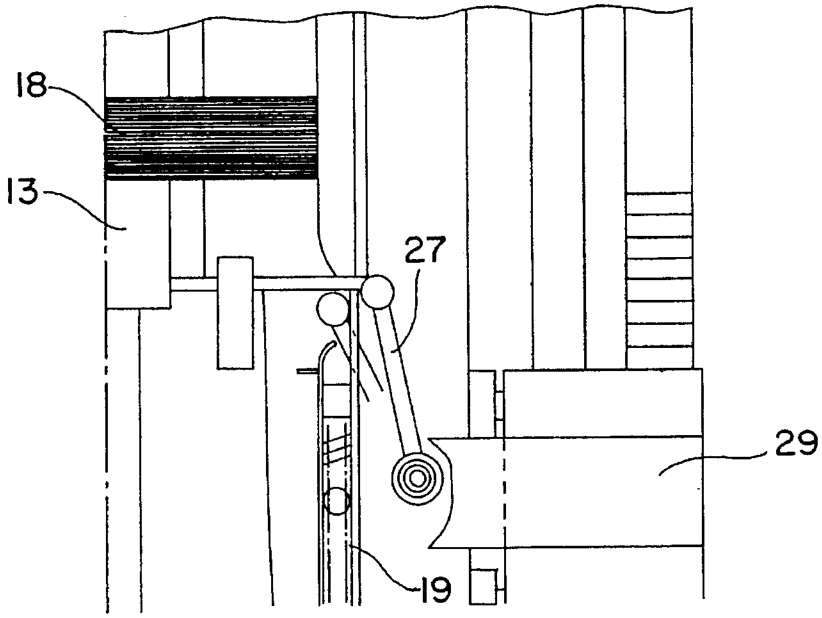
FIG. 7*b* shows a detail B of FIG. 7*a* in a further enlarged overhead view.

As shown in FIGS. 7*a* and 7*b*, the transport elements 27, in a pivoting movement initiated by the movement of the transport device 29, can be pulled from between the label stacks 18, 24, thus permitting the label stack 18 to slide against the label stack 24 to thereby join the label stacks 18, 24 to one another. Then the transport device 29 with the transport elements 27 can preferably travel to the end of the newly-inserted label stack 18 (i.e. towards apparatus 1), and the transport elements 27 can thereby pivot behind the label stack 18. The label stack 18 can now be transported in the main magazine 2 toward the gluing segments 28 of the labelling machine 3.

In accordance with one preferred method of operation of the present invention, the transport device 29 can preferably move substantially parallel to the longitudinal axis 7 of the main magazine 2, in a first direction towards the labelling machine 3, and in a second direction away from the labelling machine 3. The transport device 29 and the transport elements 27 can move in a direction towards the labelling machine 3 when the main magazine 2 has an adequate supply of labels, and can preferably serve to apply pressure to the end of the label stack 24 in the main magazine 2, in order to keep the stack of labels 24 moving towards the labelling machine 3 as the labels are used up. The rotary springs 30 can preferably serve to maintain contact between the transport elements 27 and the end of the label stack 24 in the main magazine 2. When the consumption sensor 2*c* indicates that the main magazine 2 needs refilled, the insertion tappet 13 can push a new stack of labels from a supply magazine 9 (which supply magazine 9 has been pivoted into its insertion position E) into the main magazine 2. Once the new stack of labels 18 is moved into contact with the transport elements 27, the transport device 29 can move in a direction away from the labelling machine 3, in order to pivot the transport elements 27 out from between the label stacks 18, 24. The two label stacks 18, 24 can thus preferably be joined to one another, and the insertion tappet 13 can preferably apply the pressure needed to keep the label stacks 18, 24 moving towards the gluing segments 28 while the transport elements 27 are pivoted behind the label stacks 18, 24. Once the label stacks 18, 24 have been joined to one another by removing the transport elements 27 from between them, the transport device 29 can then move towards the labelling machine 3 once again, the transport elements 27 can be pivoted back into their position against the label stacks 28, 24 with the aid of the rotary springs 30, and the insertion tappet 13 can then be retracted. Thus, the transport device 29 can then continue to move towards the labelling machine 3 to apply the necessary pressure to the label stack 18, 24 as the labels are used up.

One feature of the invention resides broadly in the apparatus for the automatic filling of the main magazine 2 of a labelling machine 3 with a label stack 18 consisting of a number of individual labels, which can be inserted from a supply magazine 9 by means of a feed device 13 into the main magazine 2 via the insertion opening 2*a* in the main magazine 2, characterized by the fact that the supply magazine 9 can be pivoted from a standby position W into an insertion position E, in which its ejection opening 11 is in contact with the insertion opening 2*a* of the main magazine 2.

Another feature of the invention resides broadly in the apparatus characterized by the fact that the supply containers are suspended in their standby position W.

Yet another feature of the invention resides broadly in the apparatus characterized by the fact that when the main magazine 2 is oriented horizontally, the supply magazine 9 in its standby position is oriented vertically.

Still another feature of the invention resides broadly in the apparatus characterized by the fact that several identical supply magazines 9 are held by arms 5 of a magazine holder 4, 6.

A further feature of the invention resides broadly in the apparatus characterized by the fact that the magazine holder 4 is designed in the manner of a carousel.

Another feature of the invention resides broadly in the apparatus characterized by the fact that the supply magazines 9, at least in the area in which the label stack 18 is supported during the insertion into the main magazine 2, each have projections in the vicinity of their ejection opening 11 which are engaged in corresponding recesses of the main magazine 2 in the insertion position E.

Yet another feature of the invention resides broadly in the apparatus characterized by the fact that retaining elements 19, in the standby position and at least a portion of the distance travelled during the insertion of the label stack 18 into the main magazine, prevent an unintentional discharge of the labels in the label stack 18 from the supply magazine 9, and that the retaining elements 19 then automatically release the label stack 18.

Still another feature of the invention resides broadly in the supply magazine for an apparatus for the automatic loading of a main magazine 2 of a labelling machine 3 with a label stack 18 consisting of a number of individual labels, whereby the supply magazine is equipped with retaining means 19 which prevent the label stack 18 from falling out before it is inserted into the main magazine 2, characterized by the fact that the retaining means 19 can be inserted into the main magazine 2 together with the respective label stack 18, that the retaining elements 19, over a portion of the distance travelled during the insertion of the label stack 18 into the main magazine 2, exert a retaining force on the label stack 18 which is opposite to the insertion force by means of the end surface 18*a* of the label stack 18, and that the retaining elements 19, when they reach the end of their insertion travel, automatically swing away from the end surface 18*a* of the label stack 18.

A further feature of the invention resides broadly in the supply magazine characterized by the fact that the retaining elements 19 are designed in the manner of leaf springs, which are axially parallel to the longitudinal axis of the label stack 18 and are located to the side of the label stack, and can be bent at a right angle to the longitudinal axis of the label stack 18.

Another feature of the invention resides broadly in the supply magazine characterized by the fact that the retaining elements 19 can be pivoted away from the end surface 18*a* of the label stack 18 by means of a guide element located at the end of its insertion travel.

Yet another feature of the invention resides broadly in the supply magazine characterized by the fact that the retaining elements 19, on their tips corresponding to the end surface 18*a* of the label stack 18, are provided with at least one segment 22 which projects from the label stack 18 and interacts with the corresponding guide element 23.

Still another feature of the invention resides broadly in the supply magazine characterized by the fact that the segment 22 is rounded outward in a funnel shape.

A further feature of the invention resides broadly in the supply magazine characterized by the fact that the retaining elements 19 can be retracted to their initial position by means of tension springs 20.

Another feature of the invention resides broadly in the supply magazine characterized by the fact that the tension springs 20 generate the retaining force exerted by the retaining elements on the label stack 18.

Yet another feature of the invention resides broadly in the use of a supply magazine in an apparatus such as that described above.

Examples of labelling machines and components thereof which could be utilized in accordance with the present invention may be disclosed in the following United States Patents: U.S. Pat. No. 4,799,605 to Kronseder on Jan. 24, 1989, entitled "Magazine Assembly for Labels or the Like in a Labeling Machine"; U.S. Pat. No. 5,024,348 to Kronseder on Jun. 18, 1991, entitled "Magazine Assembly for Labels or the Like in a Labeling Machine"; U.S. Pat. No. 4,439,262 to Zodrow et al. on Mar. 27, 1984, entitled "Labeling Station for Articles Like Bottles"; U.S. Pat. No. 4,950,350 to Zodrow et al. on Aug. 21, 1990, entitled "Machine for Labelling Bottles"; U.S. Pat. No. 5,078,826 to Rogall on Jan. 7, 1992, entitled "Labelling Machine for the Labelling of Containers"; U.S. Pat. No. 5,110,402 to Zodrow et al. on May 5, 1992, entitled "Labelling Machine for Labelling Containers Such as Bottles Having a Labelling Box for a Stack of Labels in a Labelling Station"; U.S. Pat. No. 5,017,261 to Zodrow et al. on May 21, 1991, entitled "Labelling Machine for Objects Such as Bottles or the Like"; and U.S. Pat. No. 4,944,830 to Zodrow on Jul. 31, 1990, entitled "Machine for Labelling Bottles".

Pivoting devices and sensors which may be utilized in accordance with the present invention may be disclosed in the following United States Patents: U.S. Pat. No. 4,547,972 to Heidel et al. on Oct. 22, 1985, entitled "Tilt Sensor and Monitoring System"; and U.S. Pat. No. 4,459,033 to Cleusix on Jul. 10, 1984, entitled "Timepiece with Improved Pivots for Pivotable Members and Method of Assembly".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 17 497.7, filed on May 19, 1994, having inventor Rudolf Zodrow, and DE-OS P 44 17 497.7 and DE-PS P 44 17 497.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A labelling machine for attaching a label to at least one container or the like, said labelling machine comprising:

a container platform for supporting at least one container thereon;

means for applying a label to at least one container, said means for applying a label being disposed adjacent said container platform;

means for transporting at least one container past said means for applying a label;

means for feeding at least one container into said labelling machine;

means for feeding at least one container out of said labelling machine;

means for supplying labels to said means for applying a label, said means for supplying labels comprising:

a supply magazine for containing a supply of labels;

a main magazine disposed between said supply magazine and said means for applying a label;

means for pivoting said supply magazine between a first position for loading labels from said supply magazine into said main magazine, and a second position, said second position being a standby position wherein labels are not loadable into said main magazine;

said supply magazine comprising an opening for permitting ejection of labels out of said supply magazine;

said main magazine comprising means for receiving labels from said supply magazine, said means for receiving comprising an opening; and said means for pivoting comprising means for disposing said opening of said supply magazine immediately adjacent said opening of said main magazine in said first position of said supply magazine, and for permitting transfer of the labels in said supply magazine to said main magazine.

2. The labelling machine according to claim 1 wherein at least a portion of said opening of said supply magazine is in contact with at least a portion of said opening of said main magazine in said first position of said supply magazine.

3. The labelling machine according to claim 2 wherein said main magazine is disposed substantially horizontally, said supply magazine in said second position being disposed substantially vertically with respect to said main magazine.

4. The labelling machine according to claim 3 wherein:

said means for supplying labels further comprises:

a plurality of supply magazines substantially identical to one another;

means for supporting said plurality of supply magazines, said plurality of supply magazines being disposed on said means for supporting; and a plurality of arms disposed on said means for supporting, ones of said plurality of arms for holding a corresponding one of said plurality of supply magazines;

said means for pivoting further comprises a plurality of pivoting arrangements disposed on each one of said plurality of arms.

5. The labelling machine according to claim 4 wherein:

each of said plurality of supply magazines comprises at least one projection disposed immediately adjacent said opening of each said plurality of supply magazines;

said main magazine further comprises at least one recess disposed immediately adjacent said opening of said main magazine, each of said at least one projection of each of said plurality of supply magazines being engageable with said at least one recess of said main magazine in said first position of each of said supply magazines.

6. The labelling machine according to claim 5 wherein said means for supporting comprises a carousel, each of said plurality of supply magazines being arranged spaced-apart from one another in a substantially circular manner about said carousel.

7. The labelling machine according to claim 6 wherein:

said means for supplying labels further comprises means for inserting labels from each of said plurality of supply magazines into said main magazine, said means for inserting comprising means for exerting a force in a first direction to insert labels from said supply magazine into said main magazine;

each of said plurality of supply magazines comprises:

means for retaining labels within said supply magazine, said means for retaining comprising at least one retaining member;

said at least one retaining member having means for exerting a force on the labels in each of said plurality of supply magazines in a direction to retain the labels in each of said plurality of supply magazines, said retaining direction being opposite to said first direction; and said at least one retaining member further comprising means for withdrawing said at least one retaining member from contact with the labels, as labels are being supplied by said supply magazine to said main magazine.

8. The labelling machine according to claim 7 wherein:

said at least one retaining member comprises two retaining members disposed opposite one another;

each of said plurality of supply magazines comprises a base wall and at least two side walls, said at least two side walls being disposed both opposite one another, and substantially perpendicular to said base wall;

one of said two retaining members is disposed along one of said at least two side walls, the other of said two retaining members being disposed along the other of said at least two side walls; and said means for retaining labels further comprising means for permitting movement of each of said two retaining members with respect to a corresponding one of said at least two side walls, each of said two retaining members being movable at least partially into said opening of said main magazine in said first position of said supply magazine.

9. The labelling machine according to claim 8 wherein:

each of said plurality of supply magazines is configured for containing a stack of labels, the stack of labels having a longitudinal axis;

said base wall of each of said plurality of supply magazines is disposed perpendicular to said main magazine in said second position of each of said plurality of supply magazines, said base wall having a longitudinal axis substantially parallel to the longitudinal axis of the label stack;

each of said two retaining members comprises a leaf spring disposed substantially parallel to the longitudinal axis of the label stack, each said leaf spring being movable in a direction perpendicular to the longitudinal axis of the label stack;

each said leaf spring comprises a first end and a second end, said first ends being disposed adjacent said opening of each of said plurality of said supply magazines, and said second ends of said leaf springs being disposed a substantial distance away from said first ends;

said means for withdrawing comprises a curved portion disposed on each of said first ends of said leaf springs, said curved portions each Being rounded outwardly in a direction away from the longitudinal axis of the label stack;

said main magazine further comprises two guide elements disposed spaced-apart from one another and immediately adjacent said opening of said main magazine;

said means for exerting a force comprises a projection disposed at each of said first ends of said leaf springs, said projections being in contact with the label stack;

each of said projections extend from a corresponding one of said leaf springs towards the longitudinal axis of the label stack;

each of said curved portions engages with a corresponding one of said two guide elements of said main magazine, in said first position of each of said plurality of supply magazines, to move said projections of said leaf springs out of said contact with the label stack, to release the label stack from each of said plurality of supply magazines;

said means for permitting movement of each of said two retaining members comprises a plurality of tension springs, each of said tension springs having a first end and a second end;

said first ends of said plurality of tension springs being disposed adjacent said openings of each of said plurality of supply magazines, and said second ends of said tension springs being disposed a substantial distance from said first ends of said tension springs;

each of said plurality of tension springs being disposed between a corresponding one of said leaf springs and a corresponding one of said two side walls of each of said plurality of supply magazines;

said first ends of said tension springs being attached to a corresponding one of said leaf springs, and said second ends of said tension springs being attached to a corresponding one of said side walls;

each of said tension springs being configured for permitting movement of a corresponding one of said leaf springs between a first position wherein said leaf springs are disposed substantially completely within said supply magazine, and a second position wherein said leaf springs are disposed at least partially within said opening of said main magazine, each of said two tension springs being configured to retract said leaf springs into said first position after the labels in said supply magazine have been loaded into said main magazine;

said means for exerting a force of said means for inserting comprises an insertion tappet disposed in alignment with said opening of said main magazine;

each of said plurality of supply magazines comprise an end portion disposed opposite said opening of each of said plurality of supply magazines;

said end portions of said plurality of supply magazines each comprise:

an end wall disposed substantially perpendicular to said at least two side walls;

an opening disposed in said end wall for receiving said insertion tappet in said first position of said plurality of supply magazines;

a plate disposed in contact with the label stack, said plate being disposed substantially parallel to said end wall;

an opening disposed in said plate for receiving said insertion tappet in said first position of said plurality of supply magazines, said opening of said plate being aligned with said opening of said end wall; and biasing means disposed between said end wall and said plate, said biasing means for biasing said plate towards said opening;

said means for pivoting further comprises means for suspending said supply magazine in said second position; and said at least one projection for engaging in said at least one recess being disposed along said base wall of each of said plurality of supply magazines.

10. In a labelling machine for attaching a label to at least one container or the like, the labelling machine comprising: a container platform for supporting at least one container thereon: means for applying a label to at least one container, the means for applying a label being disposed adjacent the container platform; means for transporting at least one container past the means for applying a label; means for feeding at least one container into the labelling machine; means for feeding at least one container out of the labelling machine;

means for supplying labels to the means for applying a label, said means for supplying labels comprising:

a supply magazine for containing a supply of labels;

a main magazine disposed between said supply magazine and the means for applying a label;

means for pivoting said supply magazine between a first position for loading labels from said supply magazine into said main magazine, and a second position, said second position being a standby position wherein labels are not loadable into said main magazine;

said supply magazine comprising an opening for permitting ejection of labels out of said supply magazine;

said main magazine comprising means for receiving labels from said supply magazine, said means for receiving comprising an opening; and said means for pivoting comprising means for disposing said opening of said supply magazine immediately adjacent said opening of said main magazine in said first position of said supply magazine, and for permitting transfer of the labels in said supply magazine to said main magazine.

11. The means for supplying labels in a labelling machine according to claim 10 wherein at least a portion of said opening of said supply magazine is in contact with at least a portion of said opening of said main magazine in said first position of said supply magazine.

12. The means for supplying labels in a labelling machine according to claim 11 wherein said main magazine is disposed substantially horizontally, said supply magazine in said second position being disposed substantially vertically with respect to said main magazine.

13. The means for supplying labels in a labelling machine according to claim 12 wherein:

said means for supplying labels further comprises:

a plurality of supply magazines substantially identical to one another;

means for supporting said plurality of supply magazines, said plurality of supply magazines being disposed on said means for supporting; and a plurality of arms disposed on said means for supporting, ones of said plurality of arms for holding a corresponding one of said plurality of supply magazines;

said means for pivoting further comprises a plurality of pivoting arrangements disposed on each one of said plurality of arms.

14. The means for supplying labels in a labelling machine according to claim 13 wherein:

each of said plurality of supply magazines comprises at least one projection disposed immediately adjacent said opening of each of said plurality of supply magazines;

said main magazine further comprises at least one recess disposed immediately adjacent said opening of said main magazine, each said at least one projection of each of said plurality of supply magazines being engageable with said at least one recess of said main magazine in said first position of each of said supply magazines.

15. The means for supplying labels in a labelling machine according to claim 14 wherein:

said means for supporting comprises a carousel, each of said plurality of supply magazines being arranged spaced-apart from one another in a substantially circular manner about said carousel;

said means for supplying labels further comprises means for inserting labels from each of said plurality of supply magazines into said main magazine, said means for inserting comprising means for exerting a force in a first direction to insert labels from said supply magazine into said main magazine;

each of said plurality of supply magazines comprises:

means for retaining labels within said supply magazine, said means for retaining comprising at least one retaining member;

said at least one retaining member having means for exerting a force on the labels in each of said plurality of supply magazines in a direction to retain the labels in each of said plurality of supply magazines, said retaining direction being opposite to said first direction; and said at least one retaining member further comprising means for withdrawing said at least one retaining member from contact with the labels, as labels are being supplied by said supply magazine to said main magazine;

said et least one retaining member comprises two retaining members disposed opposite one another;

each of said plurality of supply magazines comprises a base wall and at least two side walls, said at least two side walls being disposed both opposite one another, and substantially perpendicular to said base wall;

one of said two retaining members is disposed along one of said at least two side walls, the other of said two retaining members being disposed along the other of said at least two side walls;

said means for retaining labels further comprising means for permitting movement of each of said two retaining members with respect to a corresponding one of said at least two side walls, each of said two retaining members being movable at least partially into the opening of said main magazine in said first position of said supply magazine;

each of said plurality of supply magazines is configured for containing a stack of labels, the stack of labels having a longitudinal axis;

said base wall of each of said plurality of supply magazines is disposed perpendicular to said main magazine in said second position of each of said plurality of supply magazines, said base wall having a longitudinal axis substantially parallel to the longitudinal axis of the label stack;

each of said two retaining members comprises a leaf spring disposed substantially parallel to the longitudinal axis of the label stack, each said leaf spring being movable in a direction perpendicular to the longitudinal axis of the label stack;

each said leaf spring comprises a first end and a second end, said first ends being disposed adjacent said opening of each of said plurality of said supply magazines, and said second ends of said leaf springs being disposed a substantial distance away from said first ends;

said means for withdrawing comprises a curved portion disposed on each of said first ends of said leaf springs, said curved portions each being rounded outwardly in a direction away from the longitudinal axis of the label stack;

said main magazine further comprises two guide elements disposed spaced-apart from one another and immediately adjacent said opening of said main magazine;

said means for exerting a force comprises a projection disposed at each of said first ends of said leaf springs, said projections being in contact with the label stack;

each of said projections extend from a corresponding one of said leaf springs towards the longitudinal axis of the label stack;

each of said curved portions engages with a corresponding one of said two guide elements of said main magazine, in said first position of each of said plurality of supply magazines, to move said projections of said leaf springs out said contact with the label stack, to release the label stack from each of said plurality of supply magazines;

said means for permitting movement of each of said two retaining members comprises a plurality of tension springs, each of said tension springs having a first end and a second end;

said first ends of said plurality of tension springs being disposed adjacent said openings of each of said plurality of supply magazines, and said second ends of said tension springs being disposed a substantial distance away from said first ends of said tension springs;

each of said plurality of tension springs being disposed between a corresponding one of said leaf springs and a corresponding one of said two side walls of each of said plurality of supply magazines;

said first ends of said tension springs being attached to a corresponding one of said leaf springs, and said second ends of said tension springs being attached to a corresponding one of said side walls;

each of said tension springs being configured for permitting movement of a corresponding one of said two retaining members between a first position wherein said two retaining members are disposed substantially completely within said supply magazine, and a second position wherein said two retaining members are disposed at least partially within said opening of said main magazine, each of said two tension springs being configured to retract said two retaining members into said first position after the labels in said supply magazine have been loaded into said main magazine;

said means for exerting a force of said means for inserting comprises an insertion tappet disposed in alignment with the opening of said main magazine;

each of said plurality of supply magazines comprise an end portion disposed opposite said opening of each of said plurality of supply magazines;

said end portions of said plurality of supply magazines each comprise:

an end wall disposed substantially perpendicular to said at least two side walls;

an opening disposed in said end wall for receiving said insertion tappet in said first position of said plurality of supply magazines;

a plate disposed in contact with the label stack, said plate being disposed substantially parallel to said end wall;

an opening disposed in said plate for receiving said insertion tappet in said first position of said plurality of supply magazines, said opening of said plate being aligned with said opening of said end wall; and biasing means disposed between said end wall and said plate, said biasing means for biasing said plate towards said opening;

said means for pivoting further comprises means for suspending said supply magazine in said second position; and said at least one projection for engaging in said at least one recess being disposed along said base wall of each of said plurality of supply magazines.

16. In a labelling machine for attaching a label to at least one container or the like, the labelling machine comprising: a container platform for supporting at least one container thereon; means for applying a label to at least one container, the means for applying a label being disposed adjacent the container platform; means for transporting at least one container past the means for applying a label; means for feeding at least one container into the labelling machine; means for feeding at least one container out of the labelling machine; a main magazine for supplying labels to the means for applying a label; the main magazine comprising an opening for receiving labels; the main magazine further comprising two guide elements disposed spaced-apart from one another and immediately adjacent the opening of the main magazine; means for inserting labels into the main magazine, the means for inserting comprising means for exerting a force in a first direction to insert the labels into the main magazine;

a supply magazine for containing a supply of labels to be loaded into the main magazine;

said supply magazine comprising:

means for retaining labels within said supply magazine before insertion of the labels into the main magazine;

said means for retaining comprising two retaining member means;

said two retaining member means each having means for exerting a force on the labels in said supply magazine in a direction to retain the labels in said supply magazine, said retaining direction being opposite to the first direction;

said two retaining member means each comprising means for withdrawing each of said two retaining member means from contact with the labels, as labels are being supplied by said supply magazine;

said two retaining member means each comprising a retaining element, said retaining elements being disposed opposite one another;

said supply magazine further comprising a base wall and at least two side walls, said at least two side walls being disposed both opposite one another, and substantially perpendicular to said base wall;

one of said retaining elements being disposed along one of said at least two side walls, the other of said retaining elements being disposed along the other of said at least two side walls;

said means for retaining further comprising means for permitting movement of each of said retaining elements with respect to a corresponding one of said at least two side walls, each of said retaining elements being movable at least partially into the opening of the main magazine during loading of the main magazine;

said supply magazine being configured for containing a stack of labels, the stack of labels having a longitudinal axis substantially parallel to said at least two side walls;

each of said retaining elements comprising a leaf spring disposed substantially parallel to the longitudinal axis of the label stack, each said leaf spring being movable in a direction perpendicular to the longitudinal axis of the label stack;

said at least two side walls and said base wall together forming an opening for permitting ejection of labels out of said supply magazine;

each said leaf spring comprising a first end and a second end, said first ends of said leaf springs being disposed adjacent said opening of said supply magazine, and said second ends of said leaf springs being disposed a substantial distance away from said first ends;

said means for exerting a force comprising a projection disposed at each of said first ends of said leaf springs, each of said projections being in contact with the label stack;

each of said projections extending from a corresponding one of said leaf springs towards the longitudinal axis of the label stack;

said means for withdrawing comprising a curved portion disposed on each of said first ends of said leaf springs, said curved portions each being rounded outwardly in a direction away from the longitudinal axis of the label stack; and each of said curved portions engaging with a corresponding one of said two guide elements of said main magazine to move said projections of said leaf springs out of said contact with the label stack, to release the label stack from said supply magazine.

17. The supply magazine in a labelling machine according to claim 16 wherein:

said means for permitting movement comprises two tension springs, each of said two tension springs having a first end and a second end;

said first ends of said two tension springs are disposed adjacent said opening of said supply magazine, and said second ends of said two tension springs are disposed a substantial distance from said first ends of said two tension springs;

one of said two tension springs is disposed between one of said leaf springs and one of said at least two side walls of said supply magazine, and the other of said two tension springs is disposed between the other of said leaf springs and the other of said at least two side walls of said supply magazine; and each of said two tension springs being configured for permitting movement of a corresponding one of said leaf springs between a first position wherein said leaf springs are disposed substantially completely within said supply magazine, and a second position wherein said leaf springs are disposed at least partially within the opening of the main magazine, each of said two tension springs being configured to retract said leaf springs into said first position after the labels in said supply magazine have been loaded into the main magazine.

18. The supply magazine in a labelling machine according to claim 17 wherein the main magazine further comprises at least one recess disposed immediately adjacent the opening of the main magazine and wherein the means for exerting a force of the means for inserting comprises an insertion tappet disposed in alignment with the opening of the main magazine, and further wherein:

said supply magazine further comprises an end portion disposed opposite said opening of said supply magazine;

said end portion of said supply magazine comprises:

an end wall disposed substantially perpendicular to said at least two side walls;

an opening disposed in said end wall for receiving the insertion tappet during loading of the main magazine;

a plate disposed in contact with the label stack, said plate being disposed substantially parallel to said end wall;

an opening disposed in said plate for receiving the insertion tappet during loading of the main magazine, said opening of said plate being aligned with said opening of said end wall; and biasing means disposed between said end wall and said plate, said biasing means for biasing said plate towards said opening of said supply magazine;

at least a portion of said opening of said supply magazine is in contact with at least a portion of the opening of the main magazine during loading of the main magazine;

said supply magazine further comprises at least one projection disposed immediately adjacent said opening of said supply magazine;

said at least one projection is further disposed along said base wall of said supply magazine; and each of said at least one projection of said supply magazine is engageable with the at least one recess of the main magazine during loading of the main magazine.

19. A method of operating a labelling machine for attaching a label to at least one container or the like, the labelling machine comprising: a container platform for supporting at least one container thereon; means for applying a label to at least one container, said means for applying a label being disposed adjacent said container platform; means for transporting at least one container past said means for applying a label; means for feeding at least one container into said labelling machine; means for feeding at least one container out of said labelling machine; means for supplying labels to said means for applying a label, said means for supplying labels comprising: a supply magazine for containing a supply of labels; a main magazine disposed between said supply magazine and said means for applying a label; means for pivoting said supply magazine between a first position for loading labels from said supply magazine into said main magazine, and a second position, said second position being a standby position wherein labels are not loadable into said main magazine; said supply magazine comprising an opening for permitting ejection of labels out of said supply magazine; said main magazine comprising means for receiving labels from said supply magazine, said means for receiving comprising an opening; and said means for pivoting comprising means for disposing said opening of said supply magazine immediately adjacent said opening of said main magazine in said first position of said supply magazine, and for permitting transfer of the labels in said supply magazine to said main magazine, said method comprising the steps of:

providing a container platform for supporting at least one container thereon:

providing means for applying a label to at least one container, said means for applying a label being disposed adjacent said container platform;

providing means for transporting at least one container past said means for applying a label;

providing means for feeding at least one container into said labelling machine;

providing means for feeding at least one container out of said labelling machine;

providing means for supplying labels to said means for applying a label, said step of providing the means for supplying labels comprising:

providing a supply magazine containing a supply of labels;

providing a main magazine disposed between said supply magazine and said means for applying a label;

providing means for pivoting said supply magazine between a first position for loading labels from said supply magazine into said main magazine, and a second position, said second position being a standby position wherein labels are not loadable into said main magazine;

said step of providing said supply magazine further comprising providing an opening for permitting ejection of labels out of said supply magazine;

said step of providing said main magazine further comprising providing means for receiving labels from said supply magazine, said means for receiving comprising an opening;

said step of providing means for pivoting further comprising means for disposing said opening of said supply magazine immediately adjacent said opening of said main magazine in said first position of said supply magazine, and for permitting transfer of the labels in said supply magazine to said main magazine;

said method further comprising the steps of:

feeding at least one container into the labelling machine, with the means for feeding;

supporting at least one container on the means for supporting;

transporting at least one container past said means for applying a label, with the means for transporting;

applying a label to at least one container, with the means for applying a label;

supplying labels to said means for applying a label, with the means for supplying labels by:

pivoting the supply magazine from the second, standby position into the first position, with the means for pivoting;

disposing said opening of said supply magazine immediately adjacent said opening of said main magazine;

transferring the labels out of the opening of the supply magazine into the opening of the main magazine; and pivoting the supply magazine from the first position to the second, standby position with the means for pivoting.

* * * * *

UNITED STATES PATENT AND TRADEMARK OFFICE

CERTIFICATE OF CORRECTION

PATENT NO. : 5,569,353

DATED : October 29, 1996

INVENTOR(S) : Rudolf ZODROW

It is certified that error appears in the above-indentified patent and that said Letters Patent is hereby corrected as shown below:

In column 11, line 36, after 'stacks', delete "28," and insert --18,--.

In column 18, line 40, Claim 15, after 'said', delete "et" and insert --at--.

Signed and Sealed this

Fourth Day of March, 1997

Attest:

BRUCE LEHMAN

*Attesting Officer* *Commissioner of Patents and Trademarks*